(12) United States Patent
Uchida

(10) Patent No.: US 12,717,067 B2
(45) Date of Patent: Aug. 25, 2026

(54) OPTICAL ELEMENT, OPTICAL SYSTEM, IMAGE PICKUP APPARATUS, AND OPTICAL APPARATUS

(71) Applicant: CANON KABUSHIKI KAISHA, Tokyo (JP)

(72) Inventor: Kazue Uchida, Tochigi (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 406 days.

(21) Appl. No.: 18/494,909

(22) Filed: Oct. 26, 2023

(65) Prior Publication Data

US 2024/0142667 A1 May 2, 2024

(30) Foreign Application Priority Data

Oct. 31, 2022 (JP) ................................ 2022-174119

(51) Int. Cl.

*G02B 1/111* (2015.01)
*G02B 1/18* (2015.01)
*H04N 23/55* (2023.01)

(52) U.S. Cl.

CPC ................ *G02B 1/111* (2013.01); *G02B 1/18* (2015.01); *H04N 23/55* (2023.01)

(58) Field of Classification Search

CPC ......... G02B 1/111; C03C 17/28; C03C 17/30; C03C 17/34; C03C 17/3405

See application file for complete search history.

(56) References Cited

U.S. PATENT DOCUMENTS

| | | | | |
|---|---|---|---|---|
| 10,705,259 B2 | 7/2020 | Uchida | | |
| 11,435,507 B2 | 9/2022 | Ishibashi | | |
| 11,513,440 B2 | 11/2022 | Uchida | | |
| 2006/0154044 A1* | 7/2006 | Yamada | ............. | C03C 17/3411 428/312.2 |
| 2010/0053760 A1* | 3/2010 | Uchida | ................... | G02B 1/02 359/601 |

FOREIGN PATENT DOCUMENTS

| | | |
|---|---|---|
| JP | 2009-162989 A | 7/2009 |
| JP | 4828232 B2 | 11/2011 |

OTHER PUBLICATIONS

UK Search Report issued in corresponding GB Patent Application No. GB2316562.4, dated Apr. 30, 2024, pp. 1-4.

* cited by examiner

*Primary Examiner* — Paisley L Wilson

(74) *Attorney, Agent, or Firm* — Carter, DeLuca & Farrell LLP

(57) ABSTRACT

An optical element includes a substrate, and an antireflection film. The antireflection film consists of a first layer formed on the substrate, and a second layer formed on the first layer. The first layer and the second layer each include an organic compound. Predetermined inequalities are satisfied.

19 Claims, 14 Drawing Sheets

301

L $\phi$

101

12

11

Q

C

201

REFLECTANCE (%)
2
1.8
1.6
1.4
1.2
1
0.8
0.6
0.4
0.2
0
INCIDENT ANGLE OF 0°
INCIDENT ANGLE OF 15°
INCIDENT ANGLE OF 30°
INCIDENT ANGLE OF 45°
INCIDENT ANGLE OF 60°
350
400
450
500
550
600
650
700
750
800
WAVELENGTH (nm)

INCIDENT ANGLE OF 0°
INCIDENT ANGLE OF 15°
INCIDENT ANGLE OF 30°
INCIDENT ANGLE OF 45°
INCIDENT ANGLE OF 60°

REFLECTANCE (%)

2
1.8
1.6
1.4
1.2
1
0.8
0.6
0.4
0.2
0

350 400 450 500 550 600 650 700 750 800

WAVELENGTH (nm)

OPTICAL ELEMENT, OPTICAL SYSTEM, IMAGE PICKUP APPARATUS, AND OPTICAL APPARATUS

BACKGROUND

Technical Field

One of the aspects of the embodiments relates to an optical element, an optical system, an image pickup apparatus, and an optical apparatus.

Description of Related Art

Dielectric multilayers (antireflection films) with an antireflection function are often formed on the surface of an optical element such as a lens and a filter in an optical system to prevent a flare and a ghost caused by unnecessary reflections of light.

High-performance antireflective performance can be obtained if a material with a low refractive index is used for the outermost layer. An inorganic material such as a silica and a magnesium fluoride, and an organic material such as a silicon resin and an amorphous fluororesin are known to be used as the material with the low refractive index. These materials can lower the refractive index by forming voids in the layers.

Japanese Patent Laid-Open No. 2009-162989 discloses a two-layer antireflection film formed on a substrate with a refractive index of 1.70 to 1.95, consisting of a first layer that is mainly alumina and a second layer that is silica aerogel with a refractive index of 1.27.

However, the antireflection film disclosed in Japanese Patent Laid-Open No. 2009-162989 is formed by vapor deposition of the first layer consisting mainly of alumina. For this reason, in a large-open angle lens (wide-angle lens), there is a problem of film unevenness in the lens surface and insufficient antireflection performance over the entire lens surface. Furthermore, since the refractive index of the top layer is about 1.27, the antireflection performance is not sufficient when the refractive index of the substrate is 1.70 or less.

SUMMARY

An optical element according to one aspect of the embodiment includes a substrate, and an antireflection film. The antireflection film consists of a first layer formed on the substrate, and a second layer formed on the first layer. The first layer and the second layer each include an organic compound. The following inequalities are satisfied:

$$1.30 \leq n1 \leq 1.70$$

$$1.10 \leq n2 \leq 1.26$$

$$-0.2 \leq (ns-1)-2(n1-n2) \leq 0.2$$

$$100 \leq n1d1 \leq 155$$

$$100 \leq n2d2 \leq 155$$

where ns is a refractive index of the substrate at a wavelength of 550 nm, n1 is a refractive index of the first layer at a wavelength of 550 nm, n2 is a refractive index of the second layer at a wavelength of 550 nm, d1 (nm) is a physical film thickness of the first layer, and d2 (nm) is a physical film thickness of the second layer. Each of an optical system, an image pickup apparatus, and an optical apparatus including the above optical element also constitutes another aspect of the embodiment.

Further features of the disclosure will become apparent from the following description of embodiments with reference to the attached drawings.

DESCRIPTION OF THE EMBODIMENTS

Figure 1:
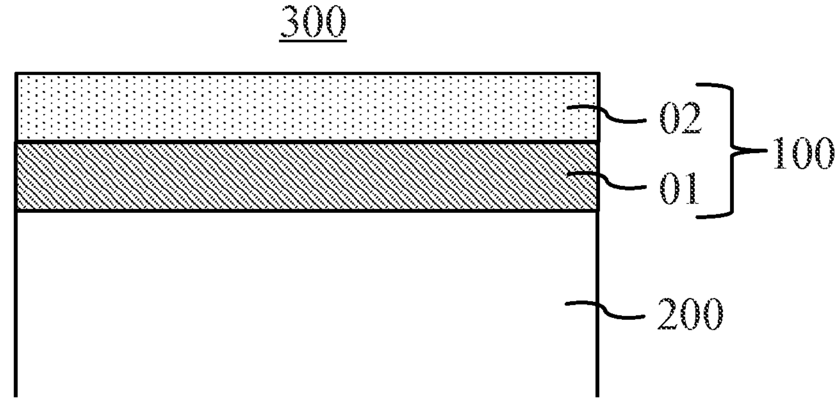
FIG. 1 is a schematic diagram illustrating one embodiment of an optical element.

Referring now to the accompanying drawings, a detailed description will be given of embodiments according to the disclosure. Corresponding elements in respective figures will be designated by the same reference numerals, and a duplicate description thereof will be omitted.

FIG. 1 is a schematic diagram illustrating one embodiment of an optical element 300 of the present disclosure. The optical element 300 has a transparent substrate (base or base material) 200 and an antireflection film 100 that is a two-layer film. The antireflection film 100 consists of a first thin film layer (first layer) 01 and a second thin film layer (second layer) 02, formed in order from the transparent substrate 200 to the air side. In other words, the first thin film layer 01 is formed on the transparent substrate 200 and the second thin film layer 02 is formed on the first thin film layer 01.

The first thin film layer 01 and the second thin film layer 02 are each made of a material containing an organic compound. An "organic compound" is a compound that contains carbon, excluding compounds with simple structures such as carbon monoxide and carbon dioxide.

Let the reference wavelength λ, be 550 nm and ns be the refractive index of the transparent substrate 200 at a wavelength of 550 nm. Let n1 be the refractive index of the first thin film layer 01 at a wavelength of 550 nm and n2 be the refractive index of the second thin film layer 02 at a wavelength of 550 nm. Let d1 (nm) be the physical film thickness of the first thin film layer 01 and d2 (nm) be the physical film thickness of the second thin film layer 02. The optical element 300 satisfies the following inequalities (1) through (5).

$$1.30 \leq n1 \leq 1.70 \quad (1)$$

$$1.10 \leq n2 \leq 1.26 \quad (2)$$

$$-0.2 \leq (ns-1)-2(n1-n2) \leq 0.2 \quad (3)$$

$$100 \leq n1d1 \leq 155 \quad (4)$$

$$100 \leq n2d2 \leq 155 \quad (5)$$

Inequality (1) defines the refractive index n1 of the first thin film layer 01 at the wavelength of 550 nm. In a case where the value becomes lower than the lower limit of inequality (1), the refractive index n1 of the first thin film layer 01 becomes too low relative to the refractive index of the second thin film layer 02 formed on it, and sufficient anti-reflection performance cannot be obtained. On the other hand, in case where the value becomes higher than the upper limit of inequality (1), it becomes difficult to fabricate the first thin-film layer 01, which is made of a material containing an organic compound, with a commonly used material.

Inequality (2) defines the refractive index n2 of the second thin film layer 02 at the wavelength of 550 nm. In a case where the value becomes lower than the lower limit of inequality (2), it becomes difficult to fabricate the second thin film layer 02, which is made of a material containing an organic compound, with a commonly used material. On the other hand, in a case where the value becomes higher than the upper limit of inequality (2), a high-performance anti-reflection film 100 cannot be obtained in the two-layer configuration of the first thin film layer 01 and the second thin film layer 02.

Inequality (3) defines the reflectance of the optical element 300. In a case where the value becomes lower than the lower limit of inequality (3) or higher than the upper limit of inequality (3), the reflectance becomes too high and sufficient antireflection performance cannot be obtained.

Inequality (4) defines the optical film thickness of the first thin film layer 01. In a case where the value becomes lower than the lower limit of inequality (4) or higher than the upper limit of inequality (4), the optical film thickness of the first thin film layer 01 does not become about λ/4, and sufficient anti-reflection performance cannot be obtained.

Inequality (5) defines the optical film thickness of the second thin film layer 02. In a case where the value becomes lower than the lower limit of inequality (5) or higher than the upper limit of inequality (5), the optical film thickness of the second thin film layer 02 does not become about λ/4, and sufficient anti-reflection performance cannot be obtained.

The numerical ranges of inequalities (1) to (5) are more preferably the ranges of inequalities (1a) to (5a) below.

$$1.40 \leq n1 \leq 1.68 \quad (1a)$$

$$1.11 \leq n2 \leq 1.25 \quad (2a)$$

$$-0.15 \leq (ns-1)-2(n1-n2) \leq 0.15 \quad (3a)$$

$$105 \leq n1d1 \leq 150 \quad (4a)$$

$$105 \leq n2d2 \leq 150 \quad (5a)$$

Further, the numerical ranges of inequalities (1) to (5) are more preferably the ranges of inequalities (1b) to (5b) below.

$$1.42 \leq n1 \leq 1.65 \quad (1b)$$

$$1.12 \leq n2 \leq 1.24 \quad (2b)$$

$$-0.12 \leq (ns-1)-2(n1-n2) \leq 0.12 \quad (3b)$$

$$110 \leq n1d1 \leq 145 \quad (4b)$$

$$110 \leq n2d2 \leq 145 \quad (5b)$$

It is further preferred that the upper limit of inequality (2b) be 1.22.

In the optical element 300, the refractive index ns of the transparent substrate 200 preferably satisfies inequality (6) below.

$$1.50 \leq ns \leq 2.10 \quad (6)$$

Inequality (6) defines the refractive index ns of the transparent substrate 200 at the wavelength of 550 nm. In a case where the value becomes lower than the lower limit of inequality (6), the refractive index ns of the transparent substrate 200 becomes too low relative to the refractive indices of the first and second thin film layers 01 and 02 formed on it, which is undesirable because sufficient anti-reflection performance cannot be obtained. On the other hand, in a case where the value becomes higher than the upper limit of inequality (6), it becomes difficult to fabricate the transparent substrate 200 with a commonly used material, which is undesirable.

The numerical range of inequality (6) is more preferably the range of inequality (6a) below.

$$1.52 \leq ns \leq 2.00 \tag{6a}$$

Further, the numerical range of inequality (6) is more preferably the range of inequality (6b) below.

$$1.53 \leq ns \leq 1.95 \tag{6b}$$

Figure 2:
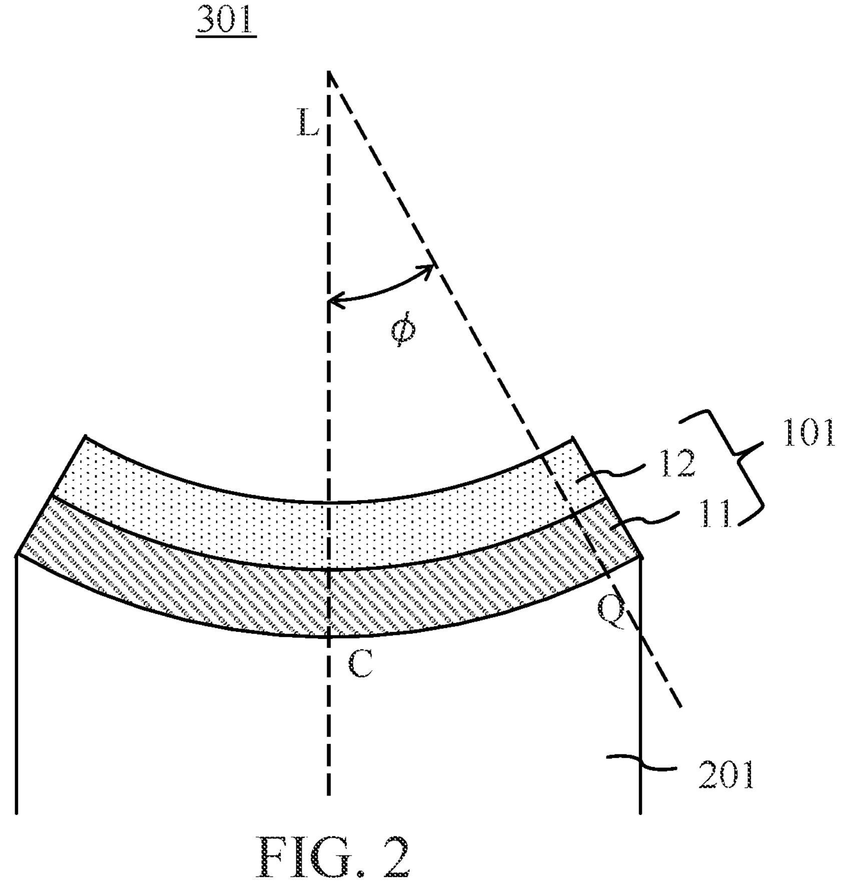
FIG. 2 illustrates a schematic cross-sectional view of optical elements of Examples 1, 4, 5, 7, 9, 10, and Comparative Examples 1 and 2.
Figure 3:
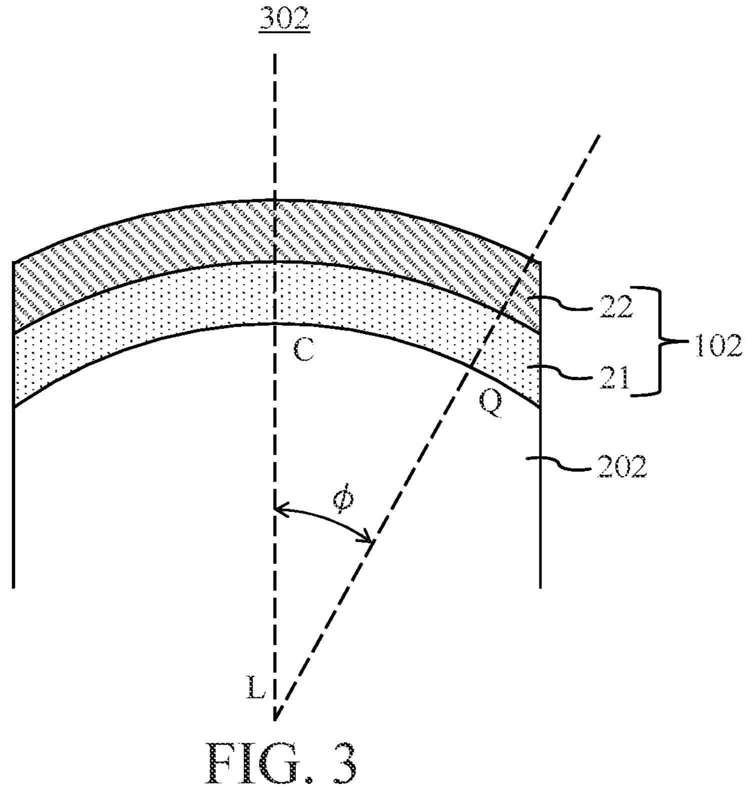
FIG. 3 illustrates a schematic cross-sectional view of optical elements of Examples 2, 3, 6, and 8.

FIG. 2 illustrates a schematic cross-sectional view of optical elements 301 of Examples 1, 4, 5, 7, 9, 10, and Comparative Examples 1 and 2. FIG. 3 illustrates a schematic cross-sectional view of optical elements 302 of Examples 2, 3, 6, and 8.

In the optical element 301, the surface of the transparent substrate 201 on which the antireflection film 101 is formed is concave in shape. In the optical element 302, the surface of the transparent substrate 202 on which the antireflection film 102 is formed is convex in shape. Hereinafter, the concave shape shown in FIG. 2 will be used for explanation, but the same applies to the convex shape shown in FIG. 3.

In the optical element 301, an optical surface forming the antireflection film 101 has a rotationally symmetrical axis, i.e., the optical surface forming the antireflection film 101 has a rotationally symmetrical shape. In FIG. 2, position C is the rotation center of the lens surface of the transparent substrate 201 provided with the antireflection film 101. In other words, position C is the intersection position where the rotationally symmetrical axis of the lens surface of the transparent substrate 201 (hereinafter referred to as optical axis L) and the lens surface of the transparent substrate 201 intersect. On the other hand, position Q is the most distant position from position C within the optically effective area on the lens surface of the transparent substrate 201. Let φ be the angle between the optical axis L and the normal at arbitrary point on the lens surface of the transparent substrate 201 (hereinafter referred to as the half-open angle). The angle between the optical axis L and the normal at position Q (half-open angle φ at position Q) is the maximum value of the half-open angle φ in the optically effective area. The half-open angle φ at position Q is the half-open angle at the maximum effective diameter of the lens surface of the transparent substrate 201. When position C of the intersection of the lens surface of the transparent substrate 201 and the optical axis L is the optical axis center, the optical axis center has the half-open angle of 0 degrees, which is a reference of the lens surface of the transparent substrate 201. The antireflection film 101 consists of the first thin film layer 11 and the second thin film layer 12, formed in order from the transparent substrate 201.

Let d1c (nm) be the physical film thickness of the first thin film layer 11 at position C and d2c (nm) be the physical film thickness of the second thin film layer 12 at position C. Let d1q (nm) be the physical film thickness of the first thin film layer 11 at position Q and d2q (nm) be the physical film thickness of the second thin film layer 12 at position Q. The optical element 301 preferably satisfies inequalities (7) and (8) below.

$$1.0 < d1q/d1c \leq 1.3 \tag{7}$$

$$1.0 < d2q/d2c \leq 1.3 \tag{8}$$

Inequality (7) defines the ratio of the physical film thickness d1q of the first thin film layer 11 at position Q to the physical film thickness d1c of the first thin film layer 11 at position C, and defines the film thickness distribution between the center and the periphery of the first thin film layer 11. As described below, the first thin film layer 11 is prepared by spin-coating to prevent unevenness in film thickness, but it is physically impossible that the value becomes lower than the lower limit of inequality (7). In a case where the value becomes higher than the upper limit of inequality (7), the difference in film thickness distribution between the center and the periphery of the first thin film layer 11 becomes larger, resulting in a larger variation in reflectance characteristics between the center and the periphery, which is undesirable.

Inequality (8) defines the ratio of the physical film thickness d2q of the second thin film layer 12 at position Q to the physical film thickness d2c of the second thin film layer 12 at position C, and defines the film thickness distribution between the center and the periphery of the second thin film layer 12. As described below, the second thin film layer 12 is prepared by spin-coating to prevent unevenness in film thickness, but it is physically impossible that the value becomes lower than the lower limit of inequality (8). In a case where the value becomes higher than the upper limit of inequality (8), the difference in film thickness distribution between the center and the periphery of the second thin film layer 12 becomes larger, resulting in a larger variation in reflectance characteristics between the center and the periphery, which is undesirable.

The numerical ranges of inequalities (7) to (8) are more preferably the ranges of inequalities (7a) to (8a) below.

$$1.01 \leq d1q/d1c \leq 1.25 \tag{7a}$$

$$1.01 \leq d2q/d2c \leq 1.25 \tag{8a}$$

Further, the numerical ranges of inequalities (7) to (8) are more preferably the ranges of inequalities (7b) to (8b) below.

$$1.015 \leq d1q/d1c \leq 1.200 \tag{7b}$$

$$1.015 \leq d2q/d2c \leq 1.200 \tag{8b}$$

In each of the first thin film layer 11 and the second thin film layer 12 that constitute the antireflection film 101, preferably, the film thickness at position C, which is the optical axis center, is the smallest and the film thickness increases as a distance from the optical axis center increases.

Furthermore, the half-open angle φ (degrees) at position Q preferably satisfies inequality (9) below.

$$25 \leq \varphi \leq 90 \tag{9}$$

Inequality (9) defines the half-open angle φ at position Q. In a case where the value become lower than the lower limit of inequality (9), the half-open angle φ at position Q is too small, and when the optical element 301 is used as a lens, the power to refract off-axis light beam among light beams passing through the lens becomes weak. This results in a decrease in peripheral light amount, which is undesirable. It is physically impossible that the value becomes higher than the upper limit of inequality (9).

The numerical range of inequality (9) is more preferably the range of inequality (9a) below.

$$27 \leq \varphi < 70 \tag{9a}$$

Further, the numerical range of inequality (9) is more preferably the range of inequality (9b) below.

$$29 \leq \varphi < 45 \tag{9b}$$

The second thin film layer 12 preferably contains voids. By containing voids or air with refractive index of 1.0 in the second thin film layer 12, the refractive index of the second thin film layer 12 can be reduced to the range of inequality (2). In a case where the refractive index of the second thin film layer 12 is less than 1.10, the film strength becomes weak because of the large proportion of voids in the layer. In a case where the refractive index of the second thin film layer 12 is larger than 1.26, the sufficient antireflection performance cannot be obtained.

The surface of the second thin film layer 12 may be provided with an antifouling layer containing a fluororesin, if necessary. Examples of the antifouling layer include a fluoropolymer layer, a fluorosilane monolayer, a titanium oxide particle layer, and the like.

The second thin film layer 12 preferably contains at least one of solid particles, chain particles, or hollow particles, and it is even more desirable to contain hollow particles with internal vacancies. The vacancies may be either monoporous or porous, and can be selected as appropriate. The material of solid particles, chain particles, or hollow particles preferably is of low refractive index, and examples thereof include organic resins such as SiO2 (silica), MgF2, fluorine, silicon, etc. SiO2 is more desirable in that it is easier to manufacture particles. The average particle diameter of hollow particles preferably is 15 nm or more and 100 nm or less, more preferably 15 nm or more and 80 nm or less. In a case where the average particle diameter of hollow particles is less than 15 nm, it is difficult to stably produce core particles. In a case where the average particle diameter is larger than 100 nm, the size of the voids between particles becomes larger, which tends to generate large voids and scattering associated with the size of the particles, which is undesirable.

The first thin film layer 11 is preferably made of a material containing polyimide resin, which is a "polymer compound containing imide (—CO—NR—CO—) bonds". The first thin film layer 11 is preferably made of a material containing an acrylic resin, which is "a polymer of acrylate or methacrylate." The first thin film layer 11 is preferably made of a material containing an epoxy resin, which is "a cured resin obtained by cross-linking an epoxy group having oxacyclopropane (oxirane), which is a three-membered ring ether, in its structural formula". Alternatively, the first thin film layer 11 is preferably made of a material containing solid particles, particularly solid silica particles, bound by a binder such as a siloxane bond.

As a method for forming the first thin film layer 11 and the second thin film layer 12, a wet film forming method in which a coating solution containing a film material is applied and dried or baked is preferable. The wet film forming method can coat large areas at low cost. In particular, the spin coating method is preferable because the in-plane film thickness distribution can be suppressed by performing the coating while rotating the rotating shaft of a coating surface. In a dry film forming method such as vapor deposition method and sputtering method, a film is formed in such a positional relationship that an evaporation source faces the central portion of a lens. In a case of a large-open angle lens, since the incident angle of vapor-deposited material to the lens surface becomes large at the peripheral portion, the film thickness is smaller than at the central portion. This causes film unevenness in the lens surface, resulting in uneven antireflection performance. In order to prevent uneven film deposition, it is necessary to set up masks and control the position and rotational motion of the substrate, which requires extensive equipment and is undesirable.

The organic solvent that can be used in the coating solution is not particularly limited to the extent that it does not impair coating properties or performance, and any known solvent can be used. Examples includes the following: monohydric alcohols such as methanol, ethanol, 1-propanol, 2-propanol, 1-butanol, 2-butanol, 2-methylpropanol, 1-pentanol, 2-pentanol, cyclopentanol, 2-methylbutanol, 3-methylbutanol, 1-hexanol, 2-hexanol, 3-hexanol, 4-methyl-2-pentanol, 2-methyl-1-pentanol, 2-ethylbutanol, 2,4-dimethyl-3-pentanol, 3-ethylbutanol, 1-heptanol, 2-heptanol, 1-octanol, and 2-octanol; dihydric or higher alcohols such as ethylene glycol and triethylene glycol; ether alcohols such as methoxyethanol, ethoxyethanol, propoxyethanol, isopropoxyethanol, butoxyethanol, 1-methoxy-2-propanol, 1-ethoxy-2-propanol, and 1-propoxy-2-propanol; ethers such as dimethoxyethane, diglyme, tetrahydrofuran, dioxane, diisopropyl ether, dibutyl ether, and cyclopentyl methyl ether; esters such as ethyl formate, ethyl acetate, n-butyl acetate, methyl lactate, ethyl lactate, ethylene glycol monomethyl ether acetate, ethylene glycol monoethyl ether acetate, ethylene glycol monobutyl ether acetate, and propylene glycol monomethyl ether acetate; various aliphatic or alicyclic hydrocarbons such as n-hexane, n-octane, cyclohexane, cyclopentane, and cyclooctane; various aromatic hydrocarbons such as toluene, xylene, and ethylbenzene; various ketones such as acetone, methyl ethyl ketone, methyl isobutyl ketone, cyclopentanone, and cyclohexanone; various chlorinated hydrocarbons such as chloroform, methylene chloride, carbon tetrachloride, and tetrachloroethane; and aprotic polar solvents such as N-methylpyrrolidone, N,N-dimethylformamide, N,N-dimethylacetamide, and ethylene carbonate. Two or more of these solvents can be mixed and used.

In a case of using solid particles, chain particles, or hollow particles for the second thin film layer 12 and solid particles for the first thin film layer 11, the particles preferably are bound together by a binder to improve strength. It is desirable to use siloxane bonds as a binder. This is especially suitable when silica particles with many hydroxyl groups on the surfaces are used.

Since the first film thin layer 11 and the second thin film layer 12 are made of materials that can be formed by the wet film forming method, the materials themselves or the binders contain organic compounds. Furthermore, since the antireflection film 101 is not baked at high temperature during a drying process after a coating process, it is possible to use plastics or other materials that are prone to thermal deformation for the transparent substrate 201.

Specific examples 1 through 10 are given below. However, these are only examples, and this disclosure is not limited to the scope of Examples 1-10. In the optical element 300, in the wavelength range of 450 nm to 650 nm, the reflectance of the antireflection film at position C is 0.5% or less at an incident angle of 0 degrees and 1.0% or less at an incident angle of 30 degrees.

Example 1

FIG. 2 is a schematic cross-sectional view of the optical element 301 according to Example 1. The optical element 301 in this example is an optical element with the antireflection film 101 formed on the transparent substrate 201. The transparent substrate 201 is made of S-TIL26 (manufactured by OHARA) with a refractive index of 1.57 (wavelength 550 nm). The lens surface of the transparent substrate 201, on which the antireflection film 101 is formed, is concave in shape. The half-open angle φ at position Q on the maximum effective diameter of the lens surface of the transparent substrate 201 is 40 degrees. As layer materials, the first thin film layer 11 consists mainly of solid silica, and the second thin film layer 12 consists mainly of hollow silica. Table 1 shows the details of the film composition of the optical element 301 in this example. The refractive index and film thickness of each material satisfy inequalities (1) through (9).

The method of forming the antireflection film 101 in this example is as follows.

(Hollow Particle Coating Solution 1)

While 1-ethoxy-2-propanol (hereinafter referred to as 1E2P) was added to 580 g of an isopropyl alcohol dispersion liquid of hollow silica particles (manufactured by JGC Catalysts and Chemicals, Suluria 4110, average particle diameter: approx. 60 nm, shell thickness: approx. 12 nm, solid concentration: 20.5 mass %), the isopropyl alcohol dispersion liquid was distilled off by heating. The isopropyl alcohol dispersion liquid was distilled off to a solid concentration of 19.5 mass % to prepare 610 g of 1E2P solvent-substituted solution of hollow silica particles (hereinafter referred to as solvent-substituted solution 1). To the resulting solvent-substituted solution 1, an organic acid containing fluorine (manufactured by Tokyo Chemical Industry, trifluoroacetic acid, fluorine number 3) was added so that a component ratio of the hollow silica particles to the organic acid containing fluorine was 100/1 to obtain a hollow particle dispersion liquid 1.

In a separate vessel, 3.6 g of phosphinic acid diluted to 0.1% concentration with pure water, 11.4 g of 1-propoxy-2-propanol, and 4.5 g of methyl polysilicate (manufactured by Colcoat, methyl silicate 53A) were slowly added, and stirred at room temperature for 120 minutes. A silica sol with a solid concentration of 12.0 mass % (hereafter referred to as silica sol 1) was prepared.

After diluting the hollow particle dispersion liquid 1 with ethyl lactate to a solid concentration of 4.5 mass %, the silica sol 1 was added so that a component ratio of the hollow silica particles to the silica sol was 100/12. The hollow particle coating solution 1 containing hollow silica particles was obtained by mixing and stirring at room temperature for 2 hours.

(Intermediate Layer Coating Solution 1)

The intermediate layer coating solution 1 was prepared by adding 300 g of 1-methoxy-2-propanol and 5 g of silica sol 1 to 25 g of silica particle dispersion liquid PL-1 (manufactured by Fuso Chemical).

The intermediate layer coating solution 1 and the hollow particle coating solution 1 are used to form the antireflection film 101.

0.2 ml of the intermediate layer coating solution 1 was dropped onto the lens surface of the transparent substrate 201 and spin coated at 4000 rpm for 20 seconds. Next, 0.2 ml of the hollow particle coating solution 1 was continuously dropped onto the lens surface of the transparent substrate 201 and spin coated at 4000 rpm for 20 seconds. Then, drying was performed in a clean room at a room temperature of 23° C. for at least 24 hours.

Figure 4:
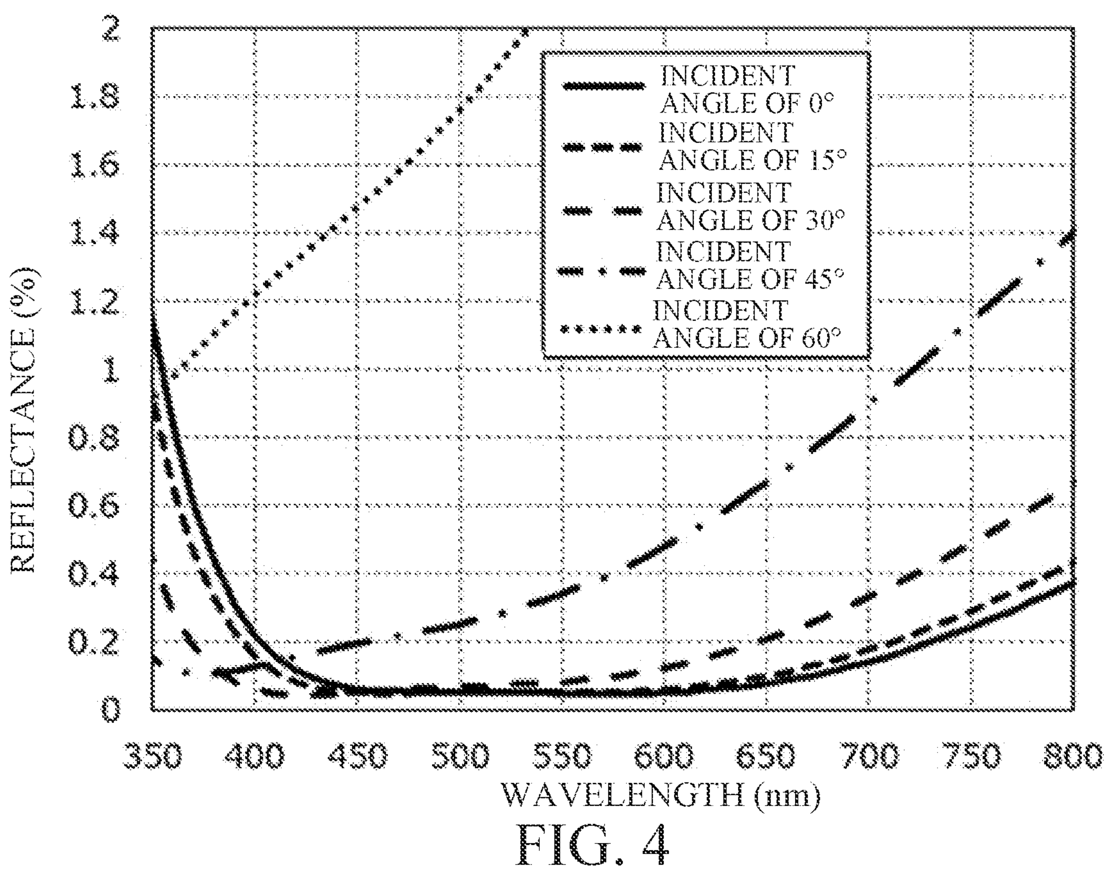
FIG. 4 shows reflectance characteristics at incident angles of 0, 15, 30, 45, and 60 degrees at position C in Example 1.
Figure 5:
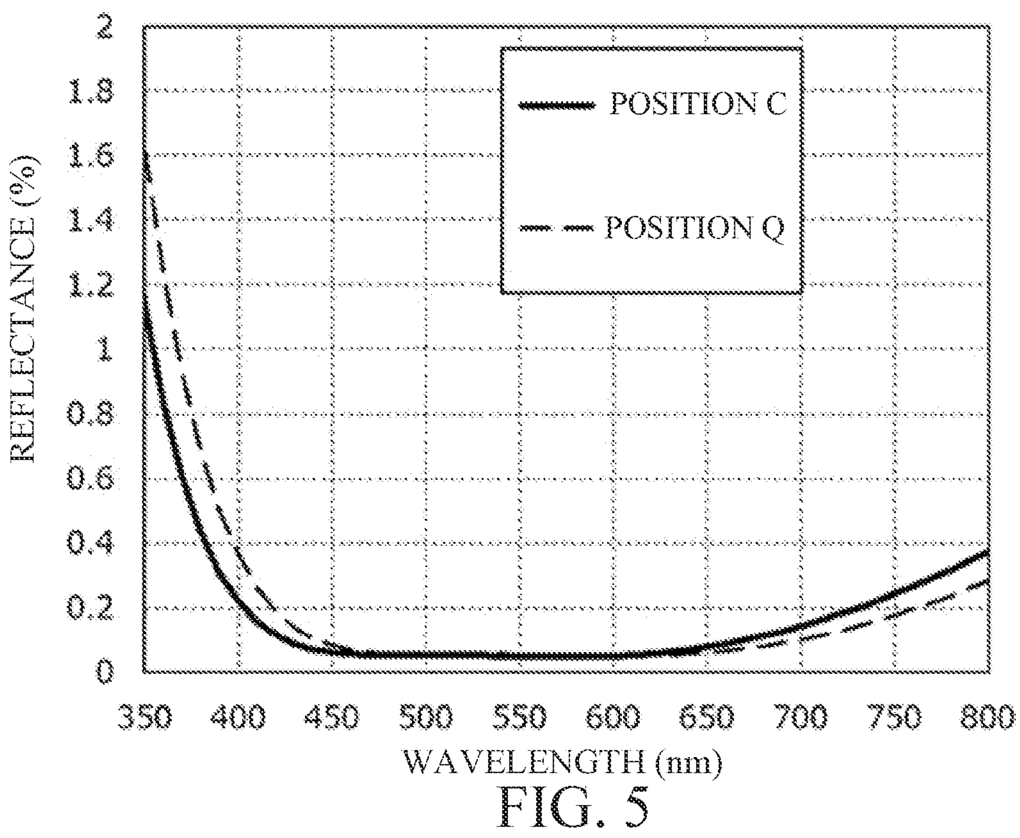
FIG. 5 shows reflectance characteristics at an incident angle of 0 degrees at positions C and Q in Example 1.

FIG. 4 shows reflectance characteristics of the antireflection film 101 at incident angles of 0, 15, 30, 45, and 60 degrees at position C. The reflectance is less than or equal to 0.2% at an incident angle of 0 degrees and within wavelengths from 420 nm to 680 nm, indicating very good reflectance properties. FIG. 5 shows reflectance characteristics at an incident angle of 0 degrees at positions C and Q. Table 1 shows that although the film thickness of each thin film layer at position Q is 4% thicker than at position C, the reflectance characteristics are almost the same at positions C and Q, confirming that the reflectance characteristics are good.

TABLE 1

| | | | REFRACTIVE INDEX | PHYSICAL FILM THICKNESS (nm) POSITION C | POSITION Q |
|---|---|---|---|---|---|
| ANTI-REFLECTION FILM 101 | SECOND THIN FILM LAYER 12 | HOLLOW SILICA | 1.19 | 106.9 | 111.2 |
| | FIRST THIN FILM LAYER 11 | SOLID SILICA | 1.45 | 85.4 | 88.9 |
| TRANSPARENT SUBSTRATE 201 | | S-TIL26 | 1.57 | — | — |

Example 2

FIG. 3 is a schematic cross-sectional view of the optical element 302 according to Example 2. The optical element 302 in this example is an optical element with the antireflection film 102 formed on the transparent substrate 202. The transparent substrate 202 is made of S-LAL12 (manufactured by OHARA) with a refractive index of 1.68 (wavelength 550 nm). The lens surface of the transparent substrate 202, on which the antireflection film 102 is formed, is convex in shape. The half-open angle φ at position Q on the maximum effective diameter of the lens surface of the transparent substrate 202 is 30 degrees. As layer materials, the first thin film layer 21 consists mainly of solid silica, and the second thin film layer 22 consists mainly of hollow silica. Table 2 shows the details of the film composition of the optical element 302 in this example. The refractive index and film thickness of each material satisfy inequalities (1) through (9).

The method of forming the antireflection film 102 in this example is as follows.

(Hollow Particle Coating Solution 2)

The preparation method for the hollow particle dispersion liquid 1 and the silica sol 1 is the same as for the hollow particle coating solution 1. After diluting the hollow particle dispersion liquid 1 with ethyl lactate to a solid concentration of 4.5 mass %, silica sol 1 was added so that a component ratio of the hollow silica particles to the silica sol was 100/9. The hollow particle coating solution 2 containing hollow silica particles was obtained by mixing and stirring at room temperature for 2 hours.

The intermediate layer coating solution 1 and the hollow particle coating solution 2 are used to form the antireflection film 102.

0.2 ml of the intermediate layer coating solution 1 was dropped onto the lens surface of the transparent substrate 202 and spin coated at 4000 rpm for 20 seconds. Next, 0.2 ml of the hollow particle coating solution 2 was continuously dropped onto the lens surface of the transparent substrate 202 and spin coated at 4000 rpm for 20 seconds. Then, drying was performed in a clean room at a room temperature of 23° C. for at least 24 hours.

Figure 6:
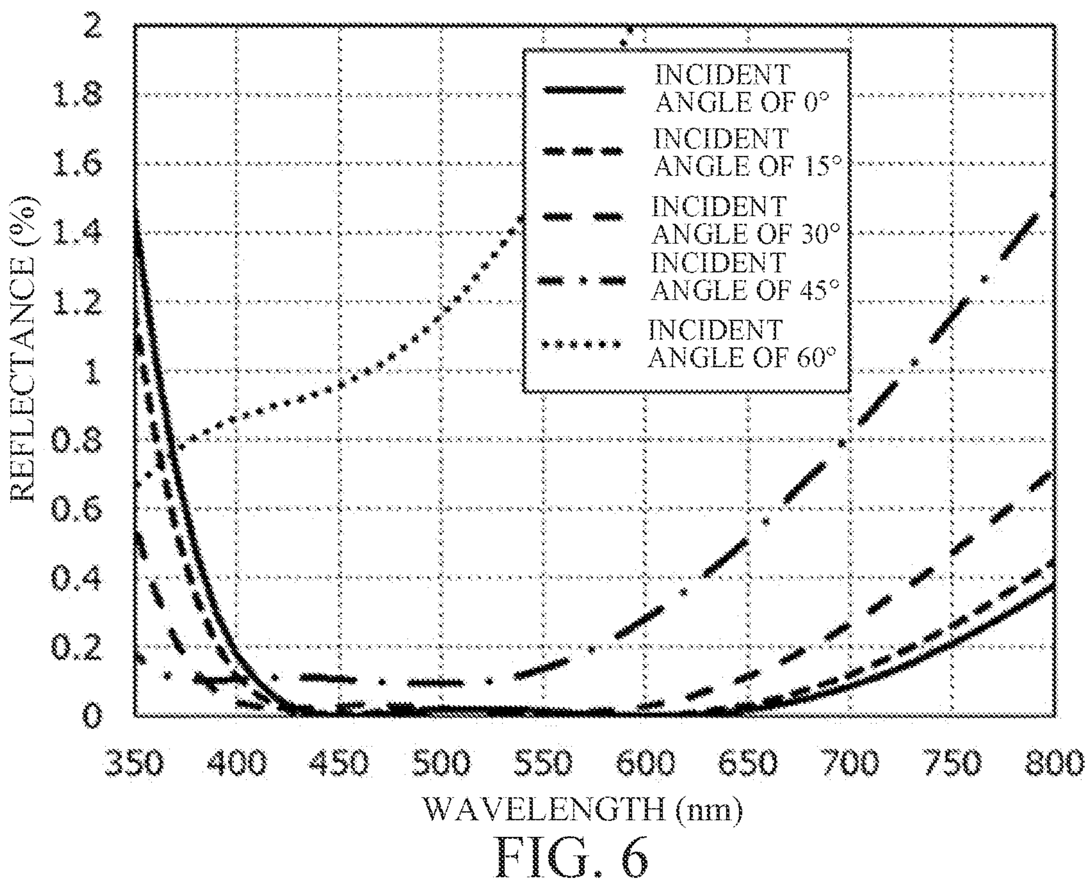
FIG. 6 shows reflectance characteristics at incident angles of 0, 15, 30, 45, and 60 degrees at position C in Example 2.
Figure 7:
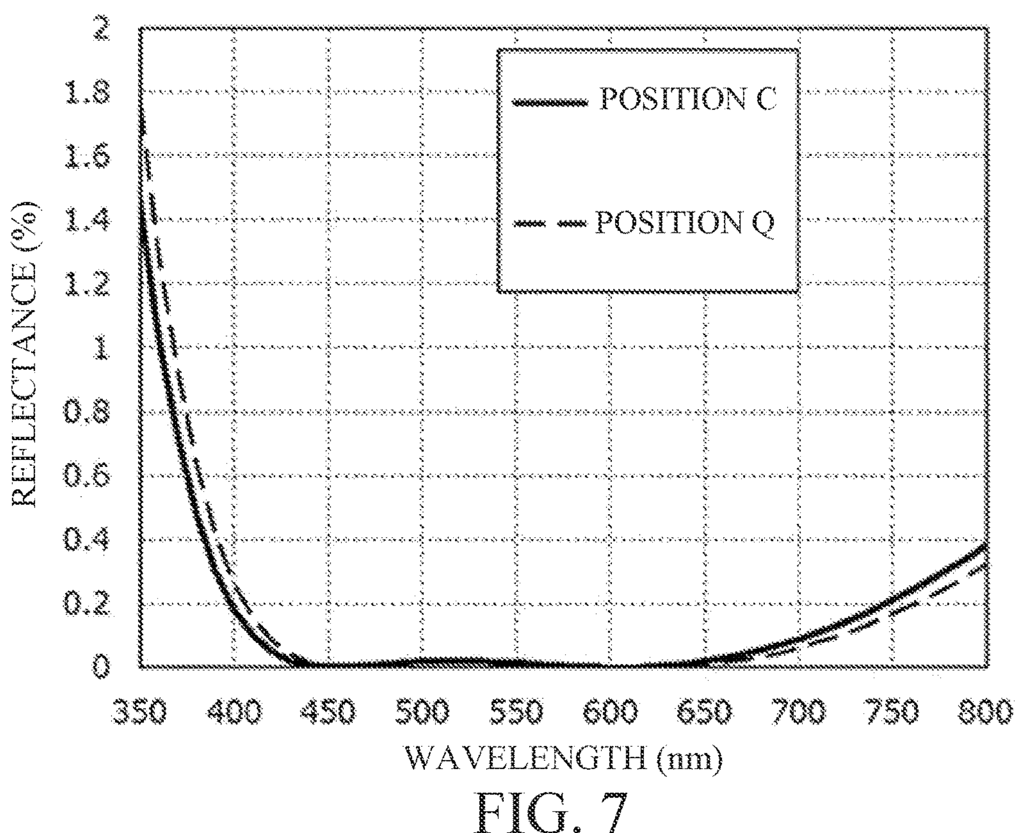
FIG. 7 shows reflectance characteristics at an incident angle of 0 degrees at positions C and Q in Example 2.

FIG. 6 shows reflectance characteristics of the antireflection film 102 at incident angles of 0, 15, 30, 45, and 60 degrees at position C. The reflectance is less than or equal to 0.2% at an incident angle of 0 degrees and within wavelengths from 420 nm to 680 nm, indicating very good reflectance properties. FIG. 7 shows reflectance characteristics at an incident angle of 0 degrees at positions C and Q. Table 2 shows that although the film thickness of each thin film layer at position Q is 2% thicker than at position C, the reflectance characteristics are almost the same at positions C and Q, confirming that the reflectance characteristics are good.

TABLE 2

| | | | | PHYSICAL FILM THICKNESS (nm) | |
|---|---|---|---|---|---|
| | | | REFRACTIVE INDEX | POSITION C | POSITION Q |
| ANTI-REFLECTION FILM 102 | SECOND THIN FILM LAYER 22 | HOLLOW SILICA | 1.14 | 111.3 | 113.5 |
| | FIRST THIN FILM LAYER 21 | SOLID SILICA | 1.45 | 87.6 | 89.3 |
| TRANSPARENT SUBSTRATE 202 | | S-LAL12 | 1.68 | — | — |

Example 3

FIG. 3 is a schematic cross-sectional view of the optical element 302 according to Example 3. The optical element 302 in this example is an optical element with the antireflection film 102 formed on the transparent substrate 202. The transparent substrate 202 is made of S-LAL12 (manufactured by OHARA) with a refractive index of 1.68 (wavelength 550 nm). The lens surface of the transparent substrate 202, on which the antireflection film 102 is formed, is convex in shape. The half-open angle φ at position Q on the maximum effective diameter of the lens surface of the transparent substrate 202 is 30 degrees. As layer materials, the first thin film layer 21 consists mainly of acrylic resin, and the second thin film layer 22 consists mainly of hollow silica. Table 3 shows the details of the film composition of the optical element 302 in this example. The refractive index and film thickness of each material satisfy inequalities (1) through (9).

The method of forming the antireflection film 102 in this example is as follows.

(Intermediate Layer Coating Solution 2)

6.1 g of N-cyclohexylmaleimide (hereinafter referred to as CHMI), 4.0 g of 2,2,2-trifluoroethyl methacrylate (product name M-3F: manufactured by Kyoeisha Chemical), 0.45 g of 3-(methacryloyloxy) propyltrimethoxysilane (product name LS-3380: manufactured by Shin-Etsu Chemical), and 0.08 g of 2,2'-azobis (isobutyronitrile) (hereafter referred to as AIBN) were stirred and dissolved in 24.8 g of toluene. This solution was repeatedly degassed and replaced with nitrogen while chilled in ice water, and then stirred at 60-70° C. for 7 hours with nitrogen flow. The polymerization solution was slowly fed into strongly stirred methanol, and the precipitated polymer was filtered off and washed several times in methanol with stirring. The filtrated and collected polymers were vacuum dried at 80-90° C. 8.3 g (81% yield) of a white powdery maleimide copolymer with a maleimide copolymerization ratio of 0.57 was obtained. The solution of maleimide copolymer 1 was prepared by dissolving 2.2 g of the powder of the maleimide copolymer 1 in 97.8 g of cyclopentanone/cyclohexanone mixed solvent to make the intermediate layer coating solution 2.

The intermediate layer coating solution 2 and the hollow particle coating solution 1 are used to form the antireflection film 102.

0.2 ml of the intermediate layer coating solution 2 was dropped onto the lens surface of the transparent substrate 202 and spin coated at 4000 rpm for 20 seconds. Next, 0.2 ml of the hollow particle coating solution 1 was continuously dropped onto the lens surface of the transparent substrate 202 and spin coated at 4000 rpm for 20 seconds. Then, drying was performed in a clean room at a room temperature of 23° C. for at least 24 hours.

Figure 8:
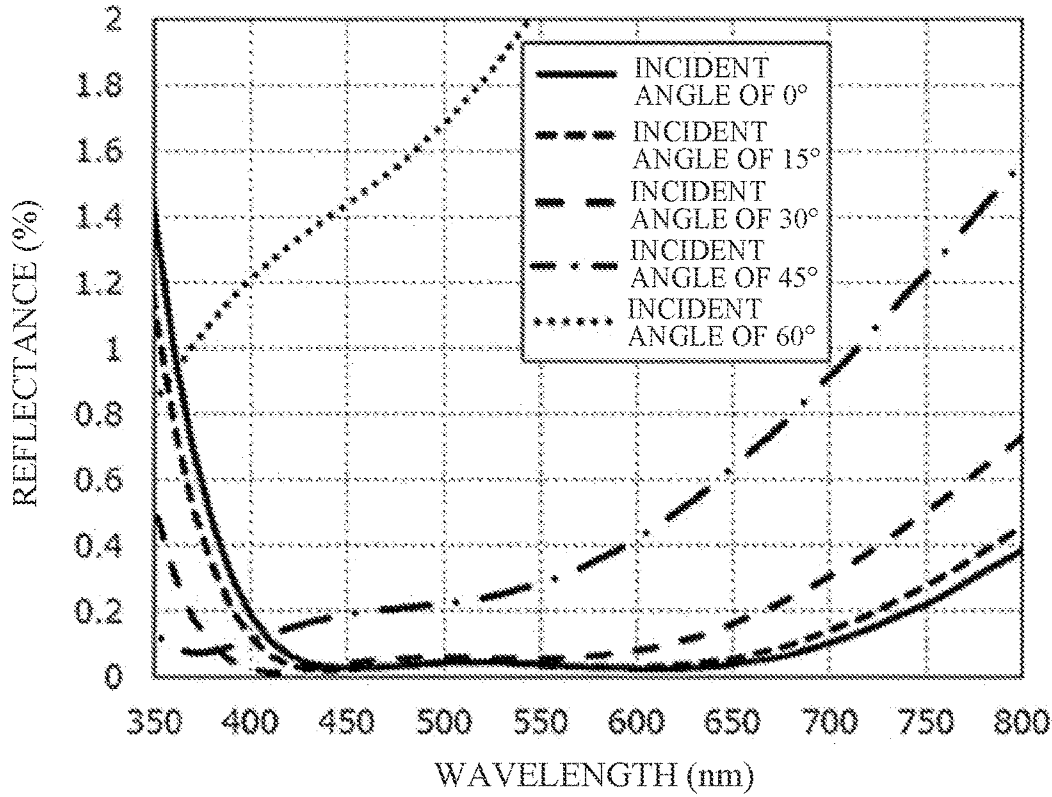
FIG. 8 shows reflectance characteristics at incident angles of 0, 15, 30, 45, and 60 degrees at position C in Example 3.
Figure 9:
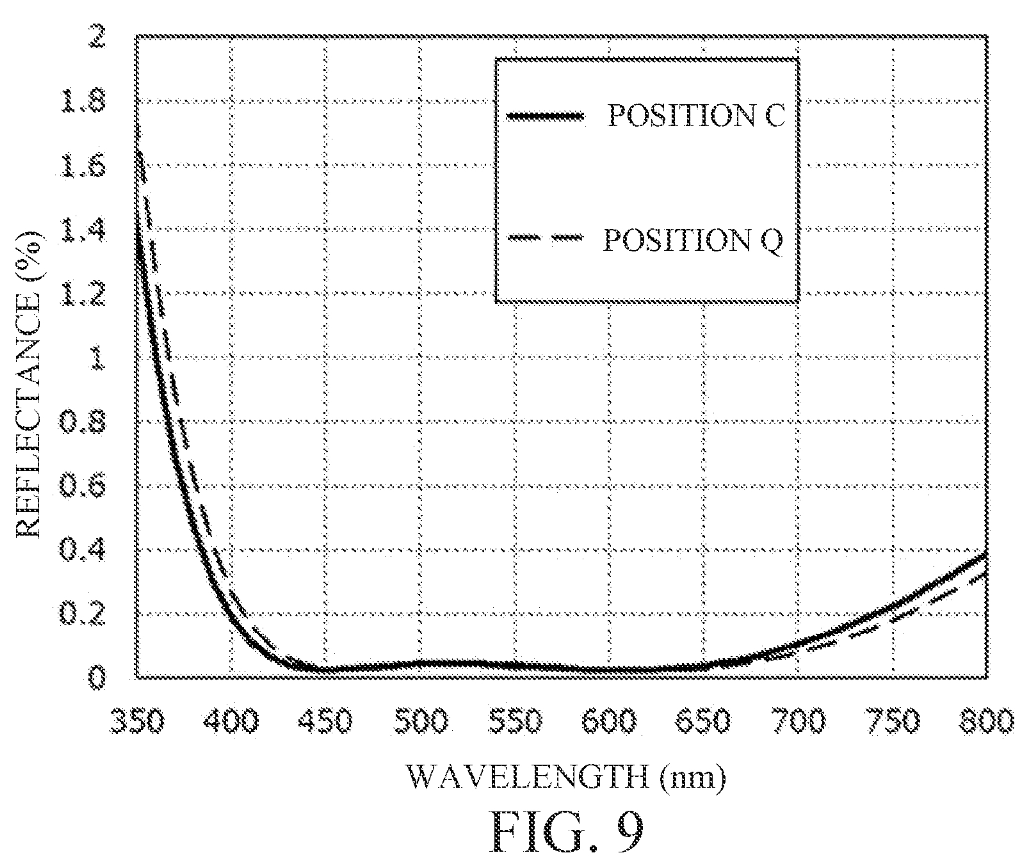
FIG. 9 shows reflectance characteristics at an incident angle of 0 degrees at positions C and Q in Example 3.

FIG. 8 shows reflectance characteristics of the antireflection film 102 at incident angles of 0, 15, 30, 45, and 60 degrees at position C. The reflectance is less than or equal to 0.2% at an incident angle of 0 degrees and within wavelengths from 420 nm to 680 nm, indicating very good reflectance properties. FIG. 9 shows reflectance characteristics at an incident angle of 0 degrees at positions C and Q. Table 3 shows that although the film thickness of each thin film layer at position Q is 2% thicker than at position C, the reflectance characteristics are almost the same at positions C and Q, confirming that the reflectance characteristics are good.

TABLE 3

| | | | | PHYSICAL FILM THICKNESS (nm) | |
|---|---|---|---|---|---|
| | | | REFRACTIVE INDEX | POSITION C | POSITION Q |
| ANTI-REFLECTION | SECOND THIN FILM LAYER 22 | HOLLOW SILICA | 1.19 | 106.9 | 109.0 |

TABLE 3-continued

| | | | REFRACTIVE INDEX | PHYSICAL FILM THICKNESS (nm) POSITION C | POSITION Q |
|---|---|---|---|---|---|
| FILM 102 | FIRST THIN FILM LAYER 21 | ACRYLIC RESIN | 1.50 | 83.6 | 85.2 |
| TRANSPARENT SUBSTRATE 202 | | S-LAL12 | 1.68 | — | — |

Example 4

FIG. 2 is a schematic cross-sectional view of the optical element 301 according to Example 4. The optical element 301 in this example is an optical element with the antireflection film 101 formed on the transparent substrate 201. The transparent substrate 201 is made of S-LAH53 (manufactured by OHARA) with a refractive index of 1.81 (wavelength 550 nm). The lens surface of the transparent substrate 201, on which the antireflection film 101 is formed, is concave in shape. The half-open angle φ at position Q on the maximum effective diameter of the lens surface of the transparent substrate 201 is 45 degrees. As layer materials, the first thin film layer 11 consists mainly of acrylic resin, and the second thin film layer 12 consists mainly of hollow silica. Table 4 shows the details of the film composition of the optical element 301 in this example. The refractive index and film thickness of each material satisfy inequalities (1) through (9).

The method of forming the antireflection film 101 in this example is as follows.

The intermediate layer coating solution 2 and the hollow particle coating solution 2 are used to form the antireflection film 101.

0.2 ml of the intermediate layer coating solution 2 was dropped onto the lens surface of the transparent substrate 201 and spin coated at 4000 rpm for 20 seconds. Next, 0.2 ml of the hollow particle coating solution 2 was continuously dropped onto the lens surface of the transparent substrate 201 and spin coated at 4000 rpm for 20 seconds. Then, drying was performed in a clean room at a room temperature of 23° C. for at least 24 hours.

Figure 10:
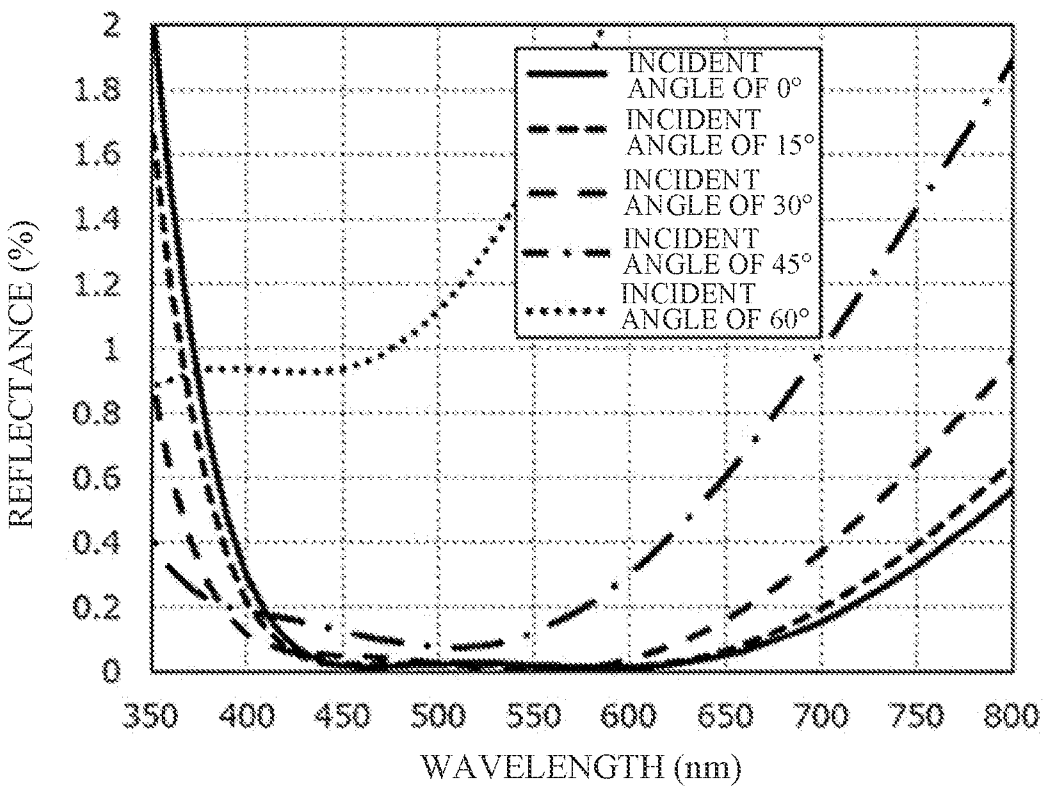
FIG. 10 shows reflectance characteristics at incident angles of 0, 15, 30, 45, and 60 degrees at position C in Example 4.
Figure 11:
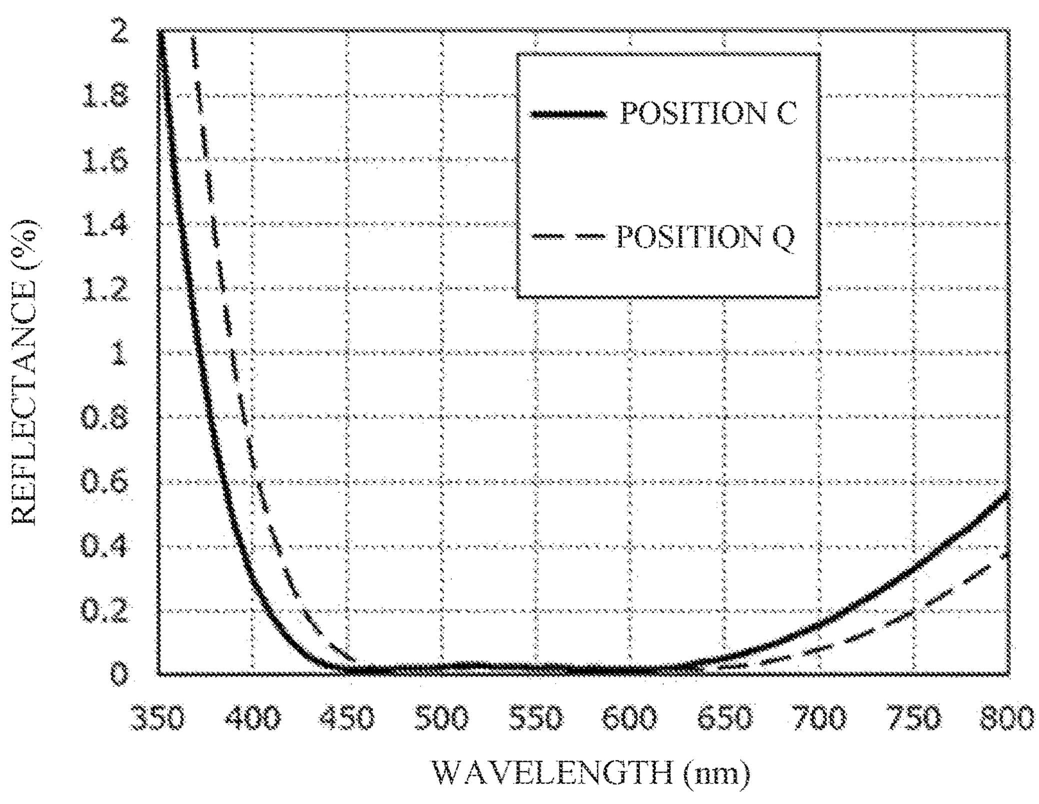
FIG. 11 shows reflectance characteristics at an incident angle of 0 degrees at positions C and Q in Example 4.

FIG. 10 shows reflectance characteristics of the antireflection film 101 at incident angles of 0, 15, 30, 45, and 60 degrees at position C. The reflectance is less than or equal to 0.2% at an incident angle of 0 degrees and within wavelengths from 420 nm to 680 nm, indicating very good reflectance properties. FIG. 11 shows reflectance characteristics at an incident angle of 0 degrees at positions C and Q. Table 4 shows that although the film thickness of each thin film layer at position Q is 5% thicker than at position C, the reflectance characteristics are almost the same at positions C and Q, confirming that the reflectance characteristics are good.

TABLE 4

| | | | REFRACTIVE INDEX | PHYSICAL FILM THICKNESS (nm) POSITION C | POSITION Q |
|---|---|---|---|---|---|
| ANTI-REFLECTION FILM 101 | SECOND THIN FILM LAYER 12 | HOLLOW SILICA | 1.14 | 112.2 | 117.8 |
| | FIRST THIN FILM LAYER 11 | ACRYLIC RESIN | 1.50 | 85.0 | 89.2 |
| TRANSPARENT SUBSTRATE 201 | | S-LAH53 | 1.81 | — | — |

Example 5

FIG. 2 is a schematic cross-sectional view of the optical element 301 according to Example 5. The optical element 301 in this example is an optical element with the antireflection film 101 formed on the transparent substrate 201. The transparent substrate 201 is made of S-LAH53 (manufactured by OHARA) with a refractive index of 1.81 (wavelength 550 nm). The lens surface of the transparent substrate 201, on which the antireflection film 101 is formed, is concave in shape. The half-open angle φ at position Q on the maximum effective diameter of the lens surface of the transparent substrate 201 is 45 degrees. As layer materials, the first thin film layer 11 consists mainly of epoxy resin, and the second thin film layer 12 consists mainly of hollow silica. Table 5 shows the details of the film composition of the optical element 301 in this example. The refractive index and film thickness of each material satisfy inequalities (1) through (9).

The method of forming the antireflection film 101 in this example is as follows.

(Intermediate Layer Coating Solution 3)

The intermediate layer coating solution 3 was prepared by adding 500 g of 1-methoxy-2-propanol to 25 g of epoxy resin jER828 (manufactured by Mitsubishi Chemical).

The intermediate layer coating solution 3 and the hollow particle coating solution 1 are used to form the antireflection film 101.

0.2 ml of the intermediate layer coating solution 3 was dropped onto the lens surface of the transparent substrate 201 and spin coated at 4000 rpm for 20 seconds. Next, 0.2 ml of the hollow particle coating solution 1 was continuously dropped onto the lens surface of the transparent substrate 201 and spin coated at 4000 rpm for 20 seconds. Then, drying was performed in a clean room at a room temperature of 23° C. for at least 24 hours.

Figure 12:
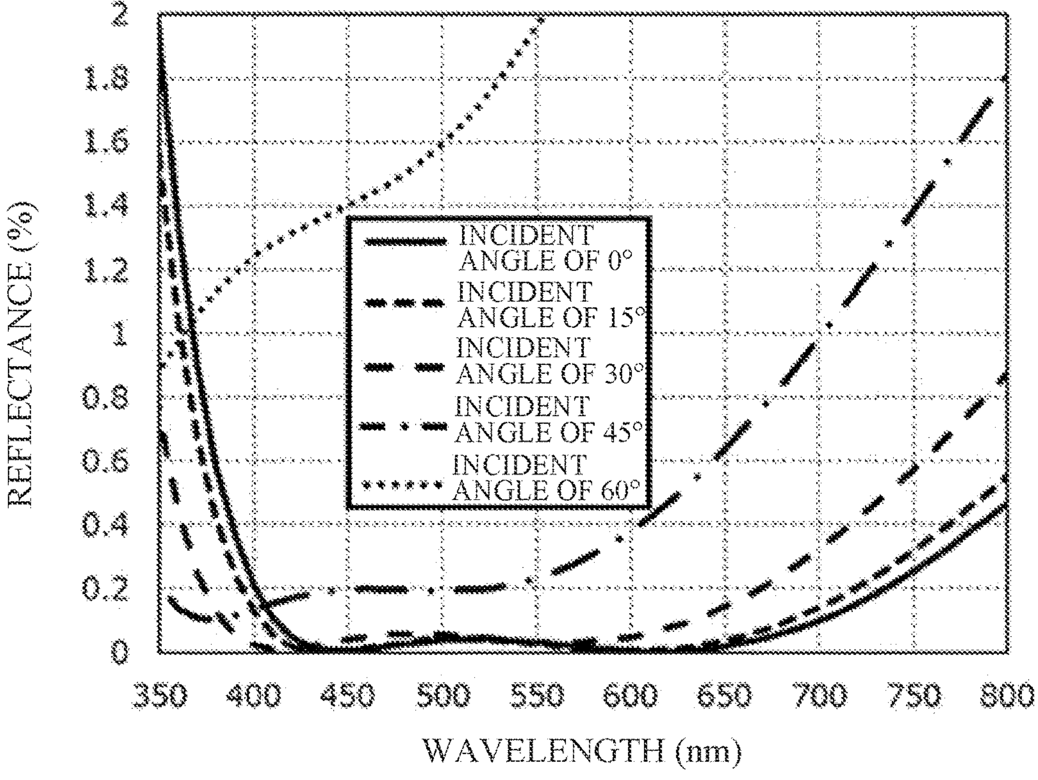
FIG. 12 shows reflectance characteristics at incident angles of 0, 15, 30, 45, and 60 degrees at position C in Example 5.
Figures 13, 14:
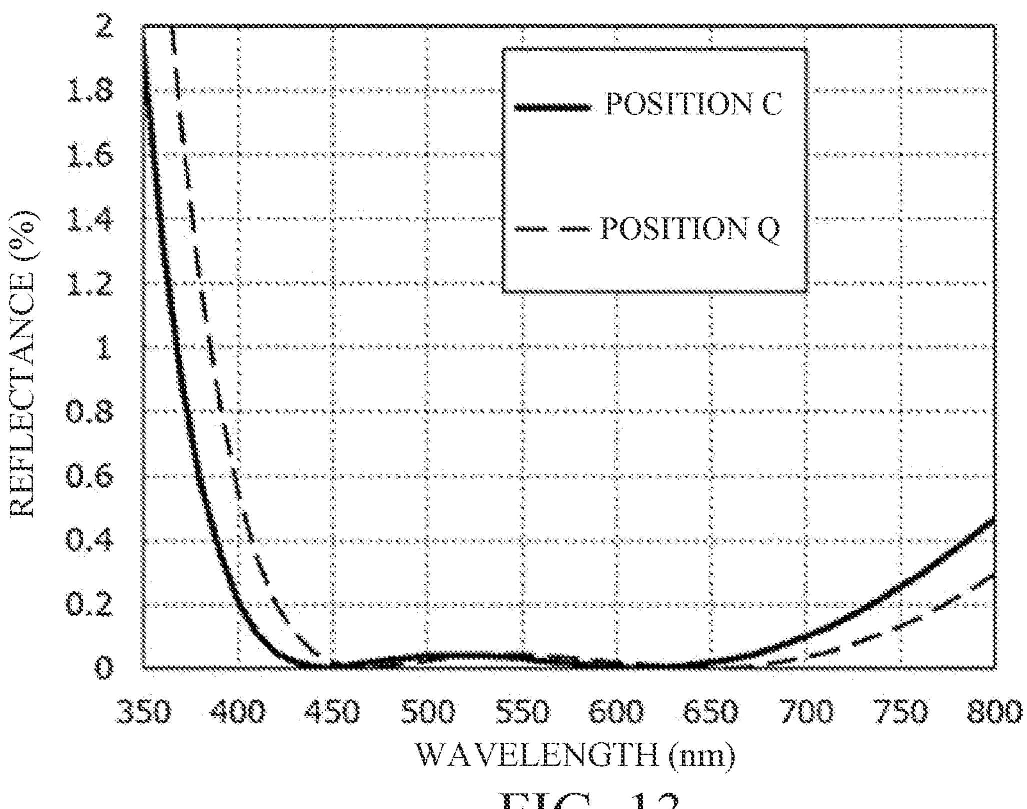
FIG. 13 shows reflectance characteristics at an incident angle of 0 degrees at positions C and Q in Example 5.
FIG. 14 shows reflectance characteristics at incident angles of 0, 15, 30, 45, and 60 degrees at position C in Example 6.

FIG. 12 shows reflectance characteristics of the antireflection film 101 at incident angles of 0, 15, 30, 45, and 60 degrees at position C. The reflectance is less than or equal to 0.2% at an incident angle of 0 degrees and within wavelengths from 420 nm to 680 nm, indicating very good reflectance properties. FIG. 13 shows reflectance characteristics at an incident angle of 0 degrees at positions C and Q. Table 5 shows that although the film thickness of each thin film layer at position Q is 5% thicker than at position C, the reflectance characteristics are almost the same at positions C and Q, confirming that the reflectance characteristics are good.

TABLE 5

| | | | REFRACTIVE INDEX | PHYSICAL FILM THICKNESS (nm) | |
|---|---|---|---|---|---|
| | | | | POSITION C | POSITION Q |
| ANTI-REFLECTION FILM 101 | SECOND THIN FILM LAYER 12 | HOLLOW SILICA | 1.19 | 107.7 | 113.1 |
| | FIRST THIN FILM LAYER 11 | EPOXY RESIN | 1.56 | 81.4 | 85.5 |
| TRANSPARENT SUBSTRATE 201 | | S-LAH53 | 1.81 | — | — |

Example 6

FIG. 3 is a schematic cross-sectional view of the optical element 302 according to Example 6. The optical element 302 in this example is an optical element with the antireflection film 102 formed on the transparent substrate 202. The transparent substrate 202 is made of S—NPH2 (manufactured by OHARA) with a refractive index of 1.92 (wavelength 550 nm). The lens surface of the transparent substrate 202, on which the antireflection film 102 is formed, is convex in shape. The half-open angle φ at position Q on the maximum effective diameter of the lens surface of the transparent substrate 202 is 30 degrees. As layer materials, the first thin film layer 21 consists mainly of polyimide resin, and the second thin film layer 22 consists mainly of hollow silica. Table 6 shows the details of the film composition of the optical element 302 in this example. The refractive index and film thickness of each material satisfy inequalities (1) through (9).

The method of forming the antireflection film 102 in this example is as follows.

(Intermediate Layer Coating Solution 4)

To 200 g of 4,4'-methylenebis(aminocyclohexane) (hereinafter referred to as DADCM, manufactured by Tokyo Chemical Industry), hexane was gradually added under reflux to completely dissolve the product. After heating was stopped and the product was left at room temperature for several days, the precipitate was filtered off and dried under reduced pressure. 58 g of purified DADCM in white solid form was obtained.

Three types of diamines, alicyclic diamine DADCM, aromatic diamine 4,4'-bis(4-aminophenoxy) biphenyl(product name BODA, manufactured by Wakayama Seika Kogyo), and siloxane-containing diamine 1,3-bis(3-aminopropyl) tetramethyldisiloxane (product name PAM-E, manufactured by Shin-Etsu Chemical) were dissolved in N,N-dimethylacetamide (hereinafter referred to as DMAc) so that the total volume is 12 mmol.

About 12 mmol of acid dianhydride was added while this diamine solution was being cooled in water. The acid dianhydride was 4-(2,5-dioxotetrahydrotetrahydrofuran-3-yl)-1,2,3,4-tetrahydronaphthalene 1,2-dicarboxylic anhydride (product name TDA-100, manufactured by New Japan Chemical) or 5-(2,5-dioxotetrahydrofuryl)-3-methyl-3-cyclo 3-methyl-3-cycl ohexene-1,2-dicarboxylic anhydride (product name B-4400, manufactured by DIC). The amount of DMAc was adjusted so that the total mass of diamine and acid dianhydride was 20% by weight.

This solution was stirred at room temperature for 15 hours for polymerization reaction. After further dilution with DMAc to 8% by weight, 7.4 ml of pyridine and 3.8 ml of acetic anhydride were added and the solution was stirred at room temperature for 1 hour. The mixture was further stirred for 4 hours while heated to 60 to 70° C. in an oil bath. The polymerization solution was put into methanol, and after removing the polymer that had re-precipitated in the methanol, the polymer was washed several times in the methanol. After drying at 60° C. for 24 hours, a white to pale yellow powdery polyimide was obtained.

The resulting polyimide was dissolved in cyclohexanone to a solid concentration of 2.5 mass % to make the intermediate layer coating solution 4.

The intermediate layer coating solution 4 and the hollow particle coating solution 1 are used to form the antireflection film 102.

0.2 ml of the intermediate layer coating solution 4 was dropped onto the lens surface of the transparent substrate 202 and spin coated at 4000 rpm for 20 seconds. Next, 0.2 ml of the hollow particle coating solution 1 was continuously dropped onto the lens surface of the transparent substrate 202 and spin coated at 4000 rpm for 20 seconds. Then, drying was performed in a clean room at a room temperature of 23° C. for at least 24 hours.

Figures 15, 16:
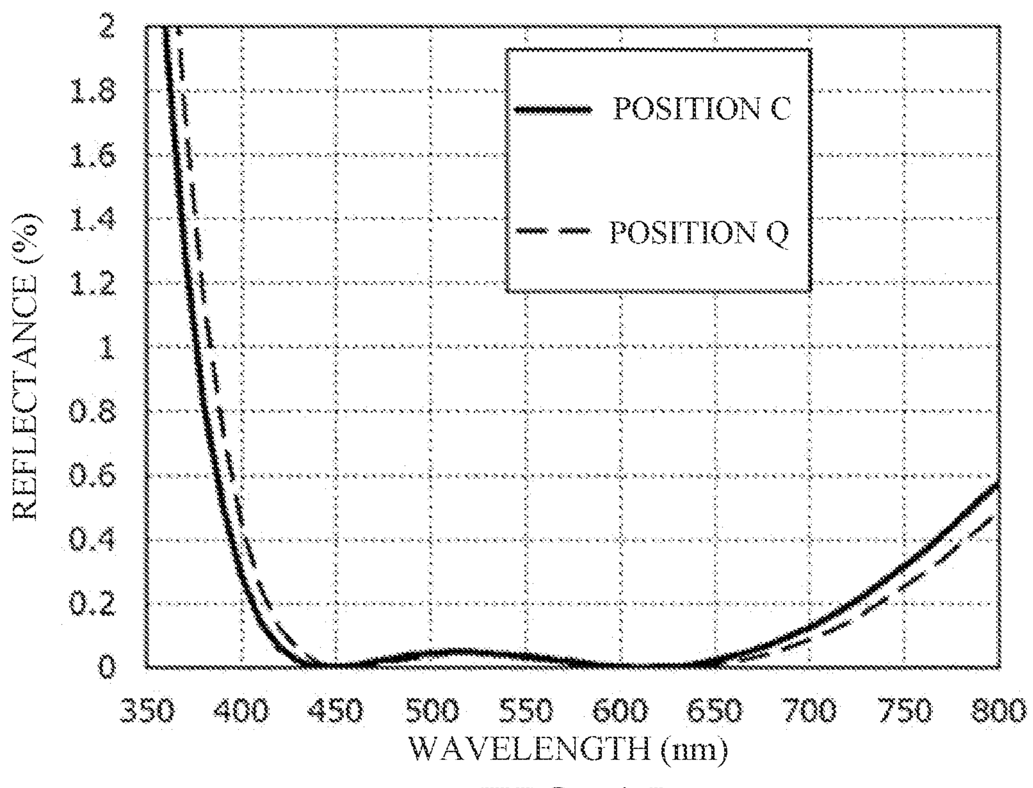
FIG. 15 shows reflectance characteristics at an incident angle of 0 degrees at positions C and Q in Example 6.
FIG. 16 shows reflectance characteristics at incident angles of 0, 15, 30, 45, and 60 degrees at position C in Example 7.

FIG. 14 shows reflectance characteristics of the antireflection film 102 at incident angles of 0, 15, 30, 45, and 60 degrees at position C. The reflectance is less than or equal to 0.2% at an incident angle of 0 degrees and within wavelengths from 420 nm to 680 nm, indicating very good reflectance properties. FIG. 15 shows reflectance characteristics at an incident angle of 0 degrees at positions C and Q. Table 6 shows that although the film thickness of each thin film layer at position Q is 2% thicker than at position C, the reflectance characteristics are almost the same at positions C and Q, confirming that the reflectance characteristics are good.

TABLE 6

| | | | REFRACTIVE INDEX | PHYSICAL FILM THICKNESS (nm) POSITION C | POSITION Q |
|---|---|---|---|---|---|
| ANTI-REFLECTION FILM 102 | SECOND THIN FILM LAYER 22 | HOLLOW SILICA | 1.19 | 109.7 | 111.9 |
| | FIRST THIN FILM LAYER 21 | POLYIMIDE RESIN | 1.62 | 79.5 | 81.1 |
| TRANSPARENT SUBSTRATE 202 | | S-NPH2 | 1.92 | — | — |

Example 7

FIG. 2 is a schematic cross-sectional view of the optical element 301 according to Example 7. The optical element 301 in this example is an optical element with the antireflection film 101 formed on the transparent substrate 201. The transparent substrate 201 is made of ZEONEX K22R (manufactured by Nippon Zeon) with a refractive index of 1.54 (wavelength 550 nm). The lens surface of the transparent substrate 201, on which the antireflection film 101 is formed, is concave in shape. The half-open angle φ at position Q on the maximum effective diameter of the lens surface of the transparent substrate 201 is 30 degrees. As layer materials, the first thin film layer 11 consists mainly of solid silica, and the second thin film layer 12 consists mainly of hollow silica. Table 7 shows the details of the film composition of the optical element 301 in this example. The refractive index and film thickness of each material satisfy inequalities (1) through (9).

The method of forming the antireflection film 101 in this example is as follows.

The intermediate layer coating solution 1 and the hollow particle coating solution 1 are used to form the antireflection film 101.

0.2 ml of the intermediate layer coating solution 1 was dropped onto the lens surface of the transparent substrate 201 and spin coated at 4000 rpm for 20 seconds. Next, 0.2 ml of the hollow particle coating solution 1 was continuously dropped onto the lens surface of the transparent substrate 201 and spin coated at 4000 rpm for 20 seconds. Then, drying was performed in a clean room at a room temperature of 23° C. for at least 24 hours.

Figure 17:
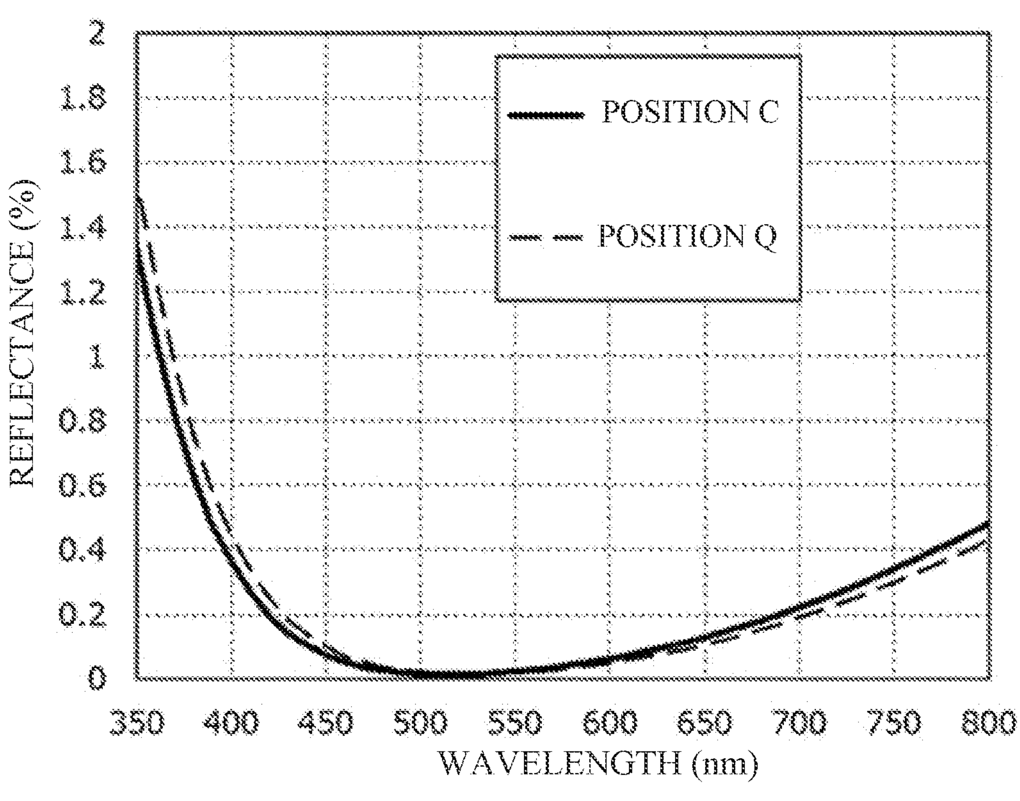
FIG. 17 shows reflectance characteristics at an incident angle of 0 degrees at positions C and Q in Example 7.

FIG. 16 shows reflectance characteristics of the antireflection film 101 at incident angles of 0, 15, 30, 45, and 60 degrees at position C. The reflectance is less than or equal to 0.2% at an incident angle of 0 degrees and within wavelengths from 420 nm to 680 nm, indicating very good reflectance properties. FIG. 17 shows reflectance characteristics at an incident angle of 0 degrees at positions C and Q. Table 7 shows that although the film thickness of each thin film layer at position Q is 2% thicker than at position C, the reflectance characteristics are almost the same at positions C and Q, confirming that the reflectance characteristics are good.

TABLE 7

| | | | REFRACTIVE INDEX | PHYSICAL FILM THICKNESS (nm) POSITION C | POSITION Q |
|---|---|---|---|---|---|
| ANTI-REFLECTION FILM 101 | SECOND THIN FILM LAYER 12 | HOLLOW SILICA | 1.19 | 107.2 | 109.3 |
| | FIRST THIN FILM LAYER 11 | SOLID SILICA | 1.45 | 85.5 | 87.2 |
| TRANSPARENT SUBSTRATE 201 | | K22R | 1.54 | — | — |

Example 8

FIG. 3 is a schematic cross-sectional view of the optical element 302 according to Example 8. The optical element 302 in this example is an optical element with the antireflection film 102 formed on the transparent substrate 202. The transparent substrate 202 is made of OKP-1 (manufactured by Osaka Gas Chemical) with a refractive index of 1.65 (wavelength 550 nm). The lens surface of the transparent substrate 202, on which the antireflection film 102 is formed, is convex in shape. The half-open angle φ at position Q on the maximum effective diameter of the lens surface of the transparent substrate 202 is 35 degrees. As layer materials, the first thin film layer 21 consists mainly of acrylic resin, and the second thin film layer 22 consists mainly of hollow silica. Table 8 shows the details of the film composition of the optical element 302 in this example. The refractive index and film thickness of each material satisfy inequalities (1) through (9).

The method of forming the antireflection film 102 in this example is as follows.

The intermediate layer coating solution 2 and the hollow particle coating solution 1 are used to form the antireflection film 102.

0.2 ml of the intermediate layer coating solution 2 was dropped onto the lens surface of the transparent substrate 202 and spin coated at 4000 rpm for 20 seconds. Next, 0.2 ml of the hollow particle coating solution 1 was continuously dropped onto the lens surface of the transparent substrate 202 and spin coated at 4000 rpm for 20 seconds. Then, drying was performed in a clean room at a room temperature of 23° C. for at least 24 hours.

Figure 18:
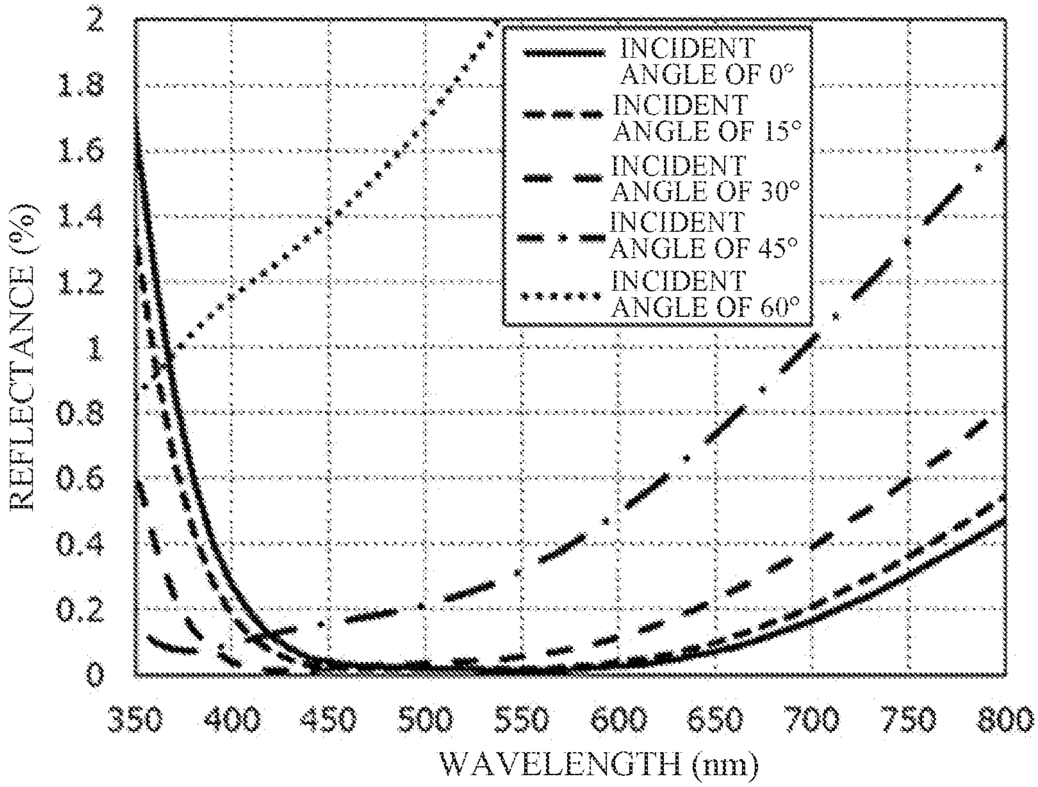
FIG. 18 shows reflectance characteristics at incident angles of 0, 15, 30, 45, and 60 degrees at position C in Example 8.
Figure 19:
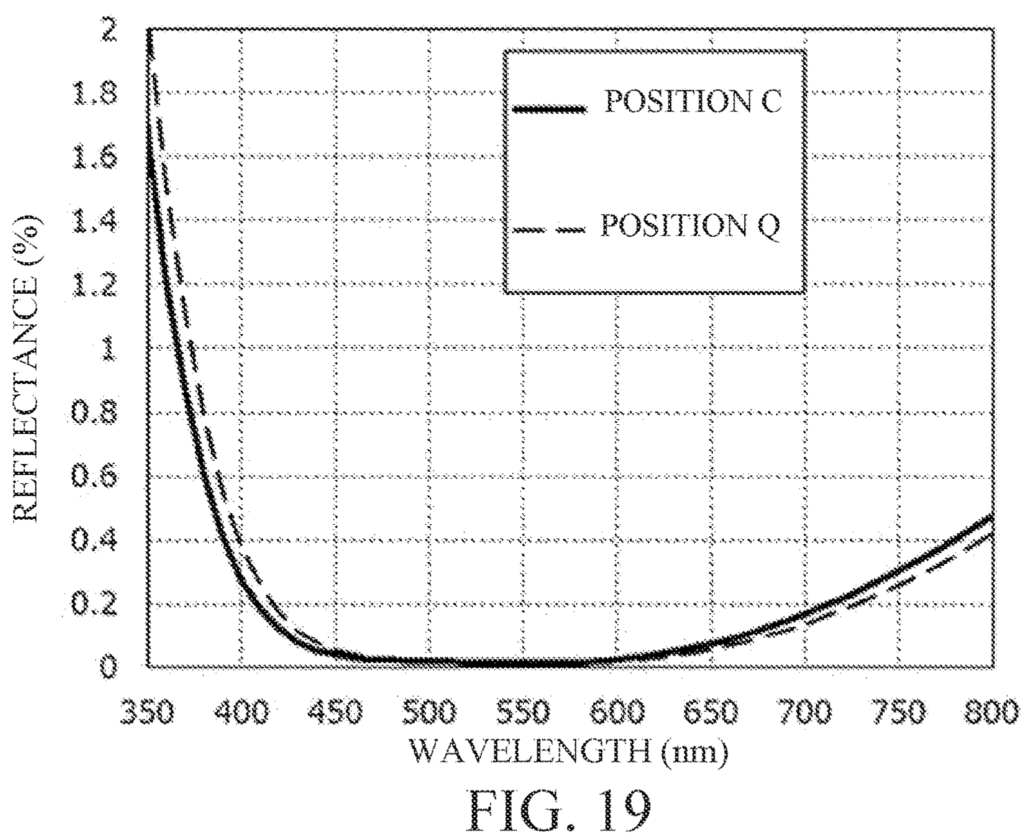
FIG. 19 shows reflectance characteristics at an incident angle of 0 degrees at positions C and Q in Example 8.

FIG. 18 shows reflectance characteristics of the antireflection film 102 at incident angles of 0, 15, 30, 45, and 60 degrees at position C. The reflectance is less than or equal to 0.2% at an incident angle of 0 degrees and within wavelengths from 420 nm to 680 nm, indicating very good reflectance properties. FIG. 19 shows reflectance characteristics at an incident angle of 0 degrees at positions C and Q. Table 8 shows that although the film thickness of each thin film layer at position Q is 3% thicker than at position C, the reflectance characteristics are almost the same at positions C and Q, confirming that the reflectance characteristics are good.

TABLE 8

| | | | | PHYSICAL FILM THICKNESS (nm) | |
|---|---|---|---|---|---|
| | | | REFRACTIVE INDEX | POSITION C | POSITION Q |
| ANTI-REFLECTION FILM 102 | SECOND THIN FILM LAYER 22 | HOLLOW SILICA | 1.19 | 109.3 | 111.5 |
| | FIRST THIN FILM LAYER 21 | ACRYLIC RESIN | 1.50 | 85.2 | 86.9 |
| TRANSPARENT SUBSTRATE 202 | | OKP-1 | 1.65 | — | — |

Example 9

FIG. 2 is a schematic cross-sectional view of the optical element 301 according to Example 9. The optical element 301 in this example is an optical element with the antireflection film 101 formed on the transparent substrate 201. An optical element called a replica element is used, in which the transparent substrate 201 is formed on the surface of a glass substrate (not shown in the figure) that serves as a base material. The transparent substrate 201 is made of LPQ-1500 (manufactured by Mitsubishi Gas Chemical) with a refractive index of 1.59 (wavelength 550 nm). The lens surface of the transparent substrate 201, on which the antireflection film 101 is formed, is concave in shape. The half-open angle φ at position Q on the maximum effective diameter of the lens surface of the transparent substrate 201 is 30 degrees. As layer materials, the first thin film layer 11 consists mainly of solid silica, and the second thin film layer 12 consists mainly of hollow silica. Table 9 shows the details of the film composition of the optical element 301 in this example. The refractive index and film thickness of each material satisfy inequalities (1) through (9).

The method of forming the antireflection film 101 in this example is as follows.

The intermediate layer coating solution 1 and the hollow particle coating solution 1 are used to form the antireflection film 101.

0.2 ml of the intermediate layer coating solution 1 was dropped onto the lens surface of the transparent substrate 201 and spin coated at 4000 rpm for 20 seconds. Next, 0.2 ml of the hollow particle coating solution 1 was continuously dropped onto the lens surface of the transparent substrate 201 and spin coated at 4000 rpm for 20 seconds. Then, drying was performed in a clean room at a room temperature of 23° C. for at least 24 hours.

Figure 20:
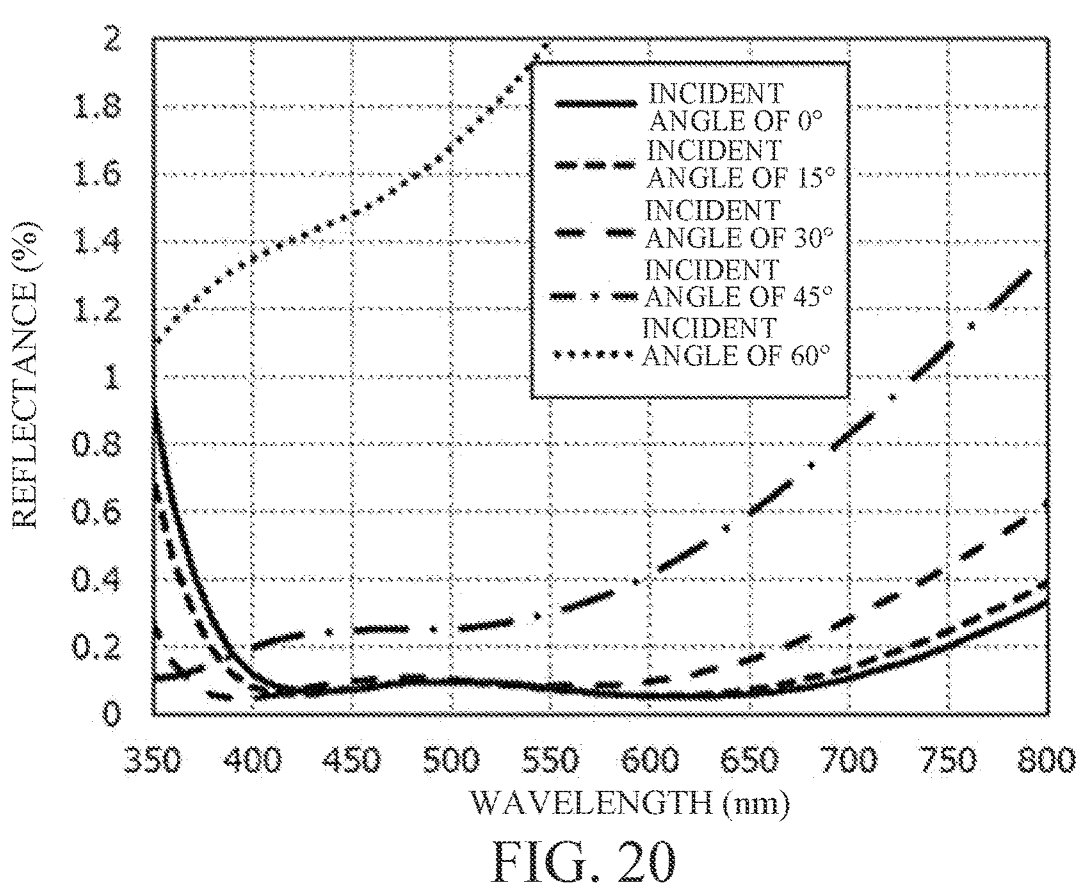
FIG. 20 shows reflectance characteristics at incident angles of 0, 15, 30, 45, and 60 degrees at position C in Example 9.
Figure 21:
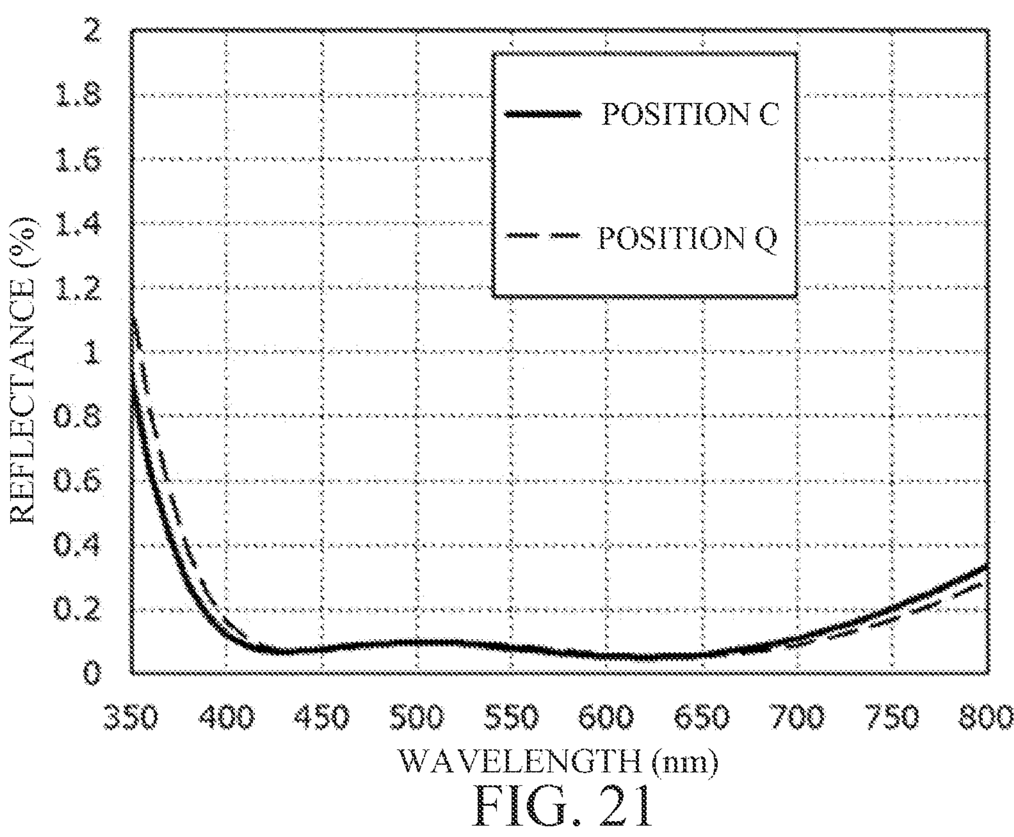
FIG. 21 shows reflectance characteristics at an incident angle of 0 degrees at positions C and Q in Example 9.

FIG. 20 shows reflectance characteristics of the antireflection film 101 at incident angles of 0, 15, 30, 45, and 60 degrees at position C. The reflectance is less than or equal to 0.2% at an incident angle of 0 degrees and within wavelengths from 420 nm to 680 nm, indicating very good reflectance properties. FIG. 21 shows reflectance characteristics at an incident angle of 0 degrees at positions C and Q. Table 9 shows that although the film thickness of each thin film layer at position Q is 2% thicker than at position C, the reflectance characteristics are almost the same at positions C and Q, confirming that the reflectance characteristics are good.

TABLE 9

| | | | | PHYSICAL FILM THICKNESS (nm) | |
|---|---|---|---|---|---|
| | | | REFRACTIVE INDEX | POSITION C | POSITION Q |
| ANTI-REFLECTION FILM 101 | SECOND THIN FILM LAYER 12 | HOLLOW SILICA | 1.19 | 106.3 | 108.4 |
| | FIRST THIN FILM LAYER 11 | SOLID SILICA | 1.45 | 85.0 | 86.7 |
| TRANSPARENT SUBSTRATE 201 | | LPQ-1500 | 1.59 | — | — |

Example 10

FIG. 2 is a schematic cross-sectional view of the optical element 301 according to Example 10. The optical element 301 in this example is an optical element with the antireflection film 101 formed on the transparent substrate 201. The transparent substrate 201 is made of S-LAH53 (manufactured by OHARA) with a refractive index of 1.81 (wavelength 550 nm). The lens surface of the transparent substrate 201, on which the antireflection film 101 is formed, is concave in shape. The half-open angle φ at position Q on the maximum effective diameter of the lens surface of the transparent substrate 201 is 30 degrees. As layer materials, the first thin film layer 11 consists mainly of polyimide resin, and the second thin film layer 12 consists mainly of chain silica. Table 10 shows the details of the film composition of the optical element 301 in this example. The refractive index and film thickness of each material satisfy inequalities (1) through (9).

The method of forming the antireflection film 101 in this example is as follows.

(Chain Particle Coating Solution 3)

The solvent 2-propanol in the 2-propanol (IPA) dispersion liquid of chain silica particles (manufactured by Nissan Chemical, IPA-ST-UP, average particle diameter: 12 nm, solid concentration: 15 mass %) was replaced by 1-propoxy-2-propanol (manufactured by Sigma) using an evaporator to make the 1-propoxy-2-propanol dispersion liquid (solid concentration 17 wt %). This was the dispersion liquid 2. Next, 18.5 g of tetraethoxysilane (TEOS, manufactured by Tokyo Chemical Industry) and 16.0 g of 0.1 wt % phosphinic acid in 10 equivalents to TEOS as catalyst water were added, and mixed and stirred in a 20° C. water bath for 60 minutes to obtain the binder solution 2.

To 251.3 g of the dispersion liquid 2, 33.4 g of the binder solution 2 was added. Then 174.5 g of 1-propoxy-2-propanol and 546.5 g of ethyl lactate were added and stirred for 60 minutes to obtain the chain particle coating solution 3.

The intermediate layer coating solution 4 and the chain particle coating solution 3 are used to form the antireflection film 101.

0.2 ml of the intermediate layer coating solution 4 was dropped onto the lens surface of the transparent substrate 201 and spin coated at 4000 rpm for 20 seconds. Next, 0.2 ml of the chain particle coating solution 3 was continuously dropped onto the lens surface of the transparent substrate 201 and spin coated at 4000 rpm for 20 seconds. Then, drying was performed in a clean room at a room temperature of 23° C. for at least 24 hours.

Figure 22:
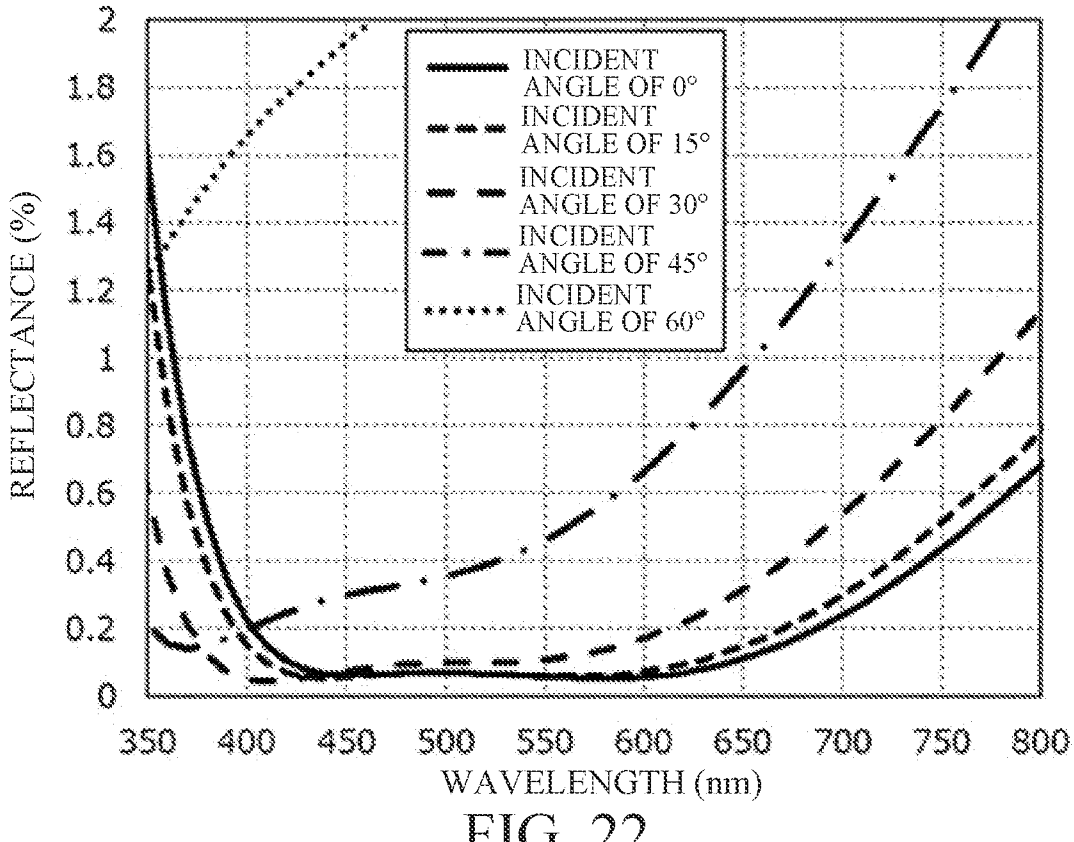
FIG. 22 shows reflectance characteristics at incident angles of 0, 15, 30, 45, and 60 degrees at position C in Example 10.
Figure 23:
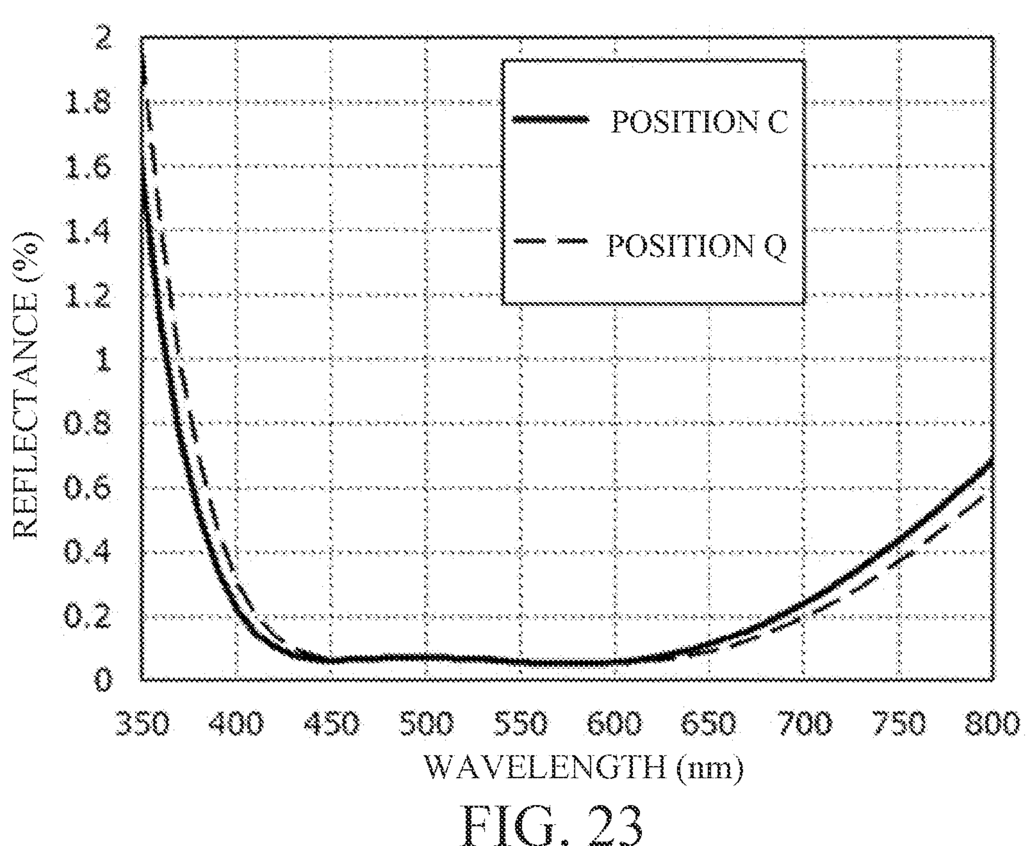
FIG. 23 shows reflectance characteristics at an incident angle of 0 degrees at positions C and Q in Example 10.

FIG. 22 shows reflectance characteristics of the antireflection film 101 at incident angles of 0, 15, 30, 45, and 60 degrees at position C. The reflectance is less than or equal to 0.2% at an incident angle of 0 degrees and within wavelengths from 420 nm to 680 nm, indicating very good reflectance properties. FIG. 23 shows reflectance characteristics at an incident angle of 0 degrees at positions C and Q. Table 10 shows that although the film thickness of each thin film layer at position Q is 2% thicker than at position C, the reflectance characteristics are almost the same at positions C and Q, confirming that the reflectance characteristics are good.

TABLE 10

| | | | | PHYSICAL FILM THICKNESS (nm) | |
|---|---|---|---|---|---|
| | | | REFRACTIVE INDEX | POSITION C | POSITION Q |
| ANTI-REFLECTION FILM 101 | SECOND THIN FILM LAYER 12 | CHAIN SILICA | 1.24 | 101.7 | 103.7 |
| | FIRST THIN FILM LAYER 11 | POLYIMIDE RESIN | 1.62 | 76.6 | 78.1 |
| TRANSPARENT SUBSTRATE 201 | | S-LAH53 | 1.81 | — | — |

Example 11

Figure 24:
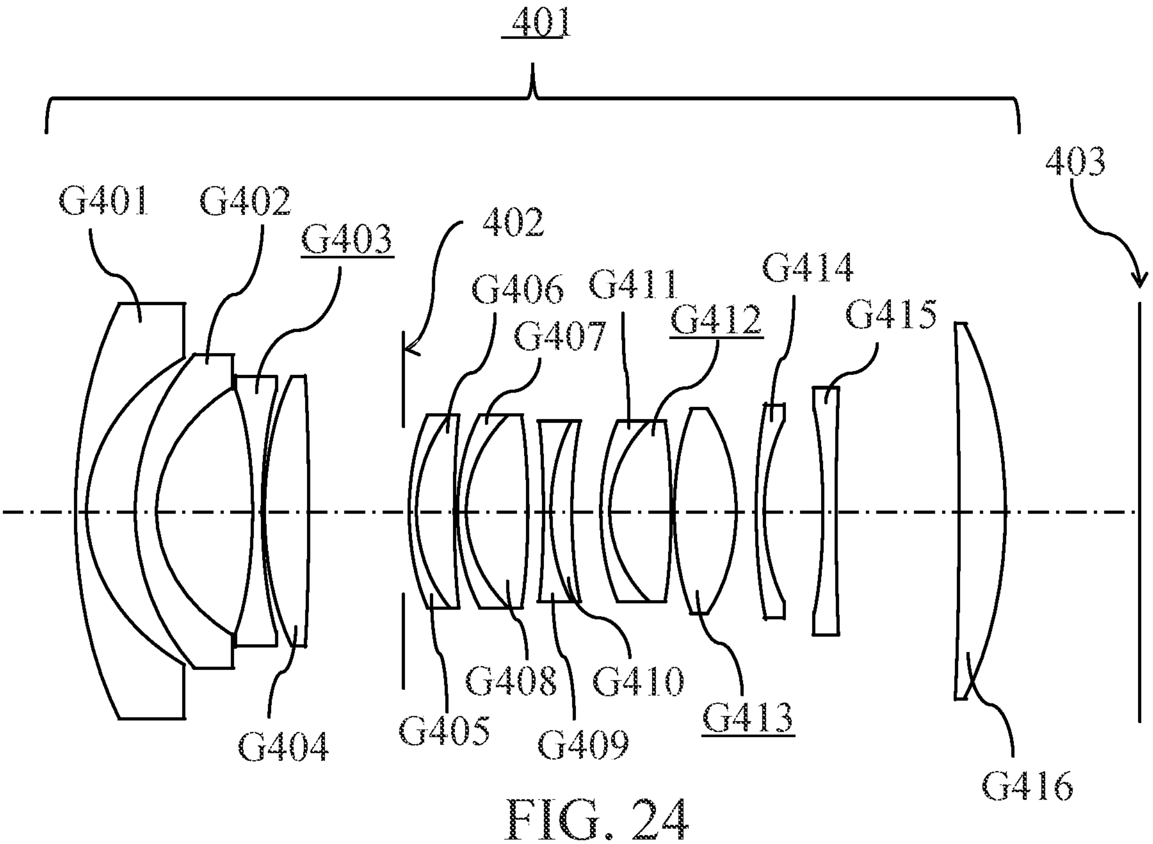
FIG. 24 illustrates a cross-sectional view of an optical system in Example 11.

Referring to FIG. 24, the optical system 401 according to Example 11 is described. FIG. 24 is a cross-sectional view of the optical system 401 in this example. The optical system 401 has a plurality of optical elements G401-G416. The reference numeral 402 indicates an aperture stop and the reference numeral 403 indicates an imaging plan. The optical elements G401-G411 are lenses, respectively. At least one of the incident surface and the exit surface of each of G401-G411 is provided with the antireflection film according to any one of Examples 1 to 10. That is, the optical system 401 has a plurality of optical elements G401-G416, and the plurality of optical elements G403, G412, and G413 are the optical elements with the antireflection film according to any one of Examples 1 to 10.

The optical system 400 in this example is not limited to an image pickup optical system used in the image pickup apparatus described below, but can be applied to optical systems for various uses in binoculars, projectors, telescopes, and other optical apparatuses.

Example 12

Figure 25:
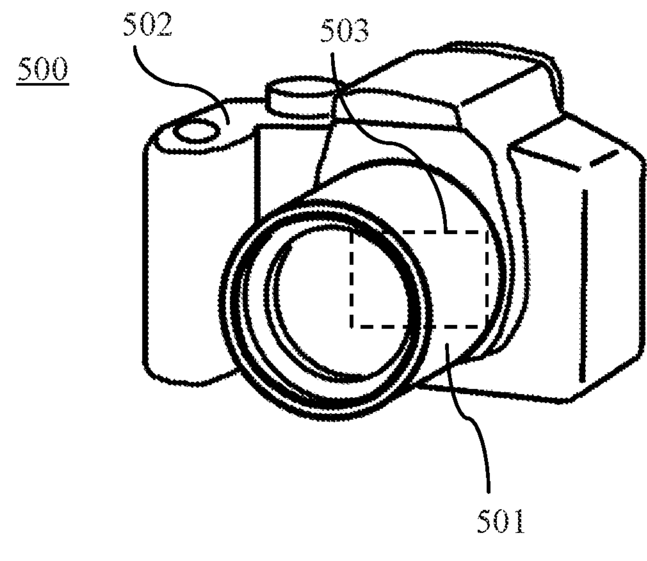
FIG. 25 illustrates an external perspective view of an image pickup apparatus in Example 12.

Next, with reference to FIG. 25, the image pickup apparatus 500 according to Example 12 is described. FIG. 25 is an external perspective view of the image pickup apparatus (digital camera) 500 in this example.

The digital camera 500 has a camera body 502 and a lens apparatus 501 that is integrally configured with the camera body 502. However, this example is not limited to this, and the lens apparatus 501 may be a detachable interchangeable lens for the camera body 502, such as for single-lens reflex cameras or mirrorless cameras. The lens apparatus 501 has the optical system 401 according to Example 11. The camera body 502 has an image sensor 503, such as a CMOS sensor or CCD sensor. The image sensor 503 is placed on the imaging plane 403 of the optical system 401.

Comparative Examples 1 and 2 of this disclosure are described below.

Comparative Example 1

FIG. 2 is a schematic cross-sectional view of the optical element 301 according to Comparative Example 1. The optical element 301 in this comparative example is an optical element with the antireflection film 101 formed on the transparent substrate 201. The transparent substrate 201 is made of S-TIL26 (manufactured by OHARA) with a refractive index of 1.57 (wavelength 550 nm). The lens surface of the transparent substrate 201, on which the antireflection film 101 is formed, is concave in shape. The half-open angle φ at position Q on the maximum effective diameter of the lens surface of the transparent substrate 201 is 40 degrees. As layer materials, the first thin film layer 11 consists of SiO2 formed by vapor deposition, and the second thin film layer 12 consists mainly of hollow silica. Table 11 shows the details of the film composition of the optical element 301 in this comparative example. The refractive index and film thickness of each material satisfy inequalities (1) through (6) but do not satisfy inequalities (7) and (8).

The method of forming the antireflection film 101 in this comparative example is as follows.

The first thin film layer 11 was formed by vapor deposition. The vacuum chamber of the evaporation apparatus was evacuated to a high vacuum region near 2×10−3 (Pa). After confirming that the inside of the vacuum chamber had reached a high vacuum state, oxygen was introduced into the vacuum chamber to create a vacuum pressure of about 1×10−2 (Pa) for SiO2 deposition.

After the film formation of the first thin film layer 11 was completed, 0.2 ml of the hollow particle coating solution 1 was dropped onto the first thin film layer 11 and spin coated at 4000 rpm for 20 seconds. Then, drying was performed in a clean room at a room temperature of 23° C. for at least 24 hours.

Figure 26:
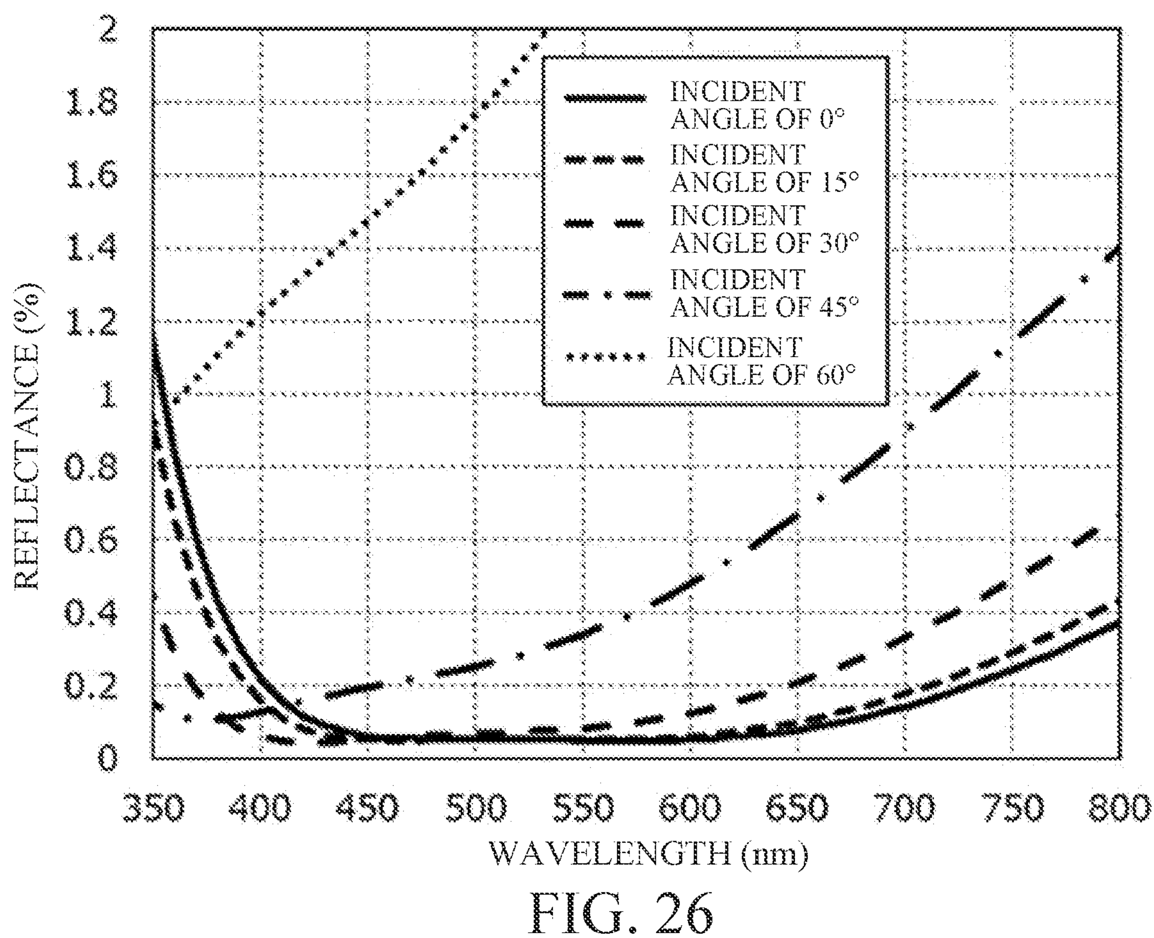
FIG. 26 shows reflectance characteristics at incident angles of 0, 15, 30, 45, and 60 degrees at position C in Comparative Example 1.
Figure 27:
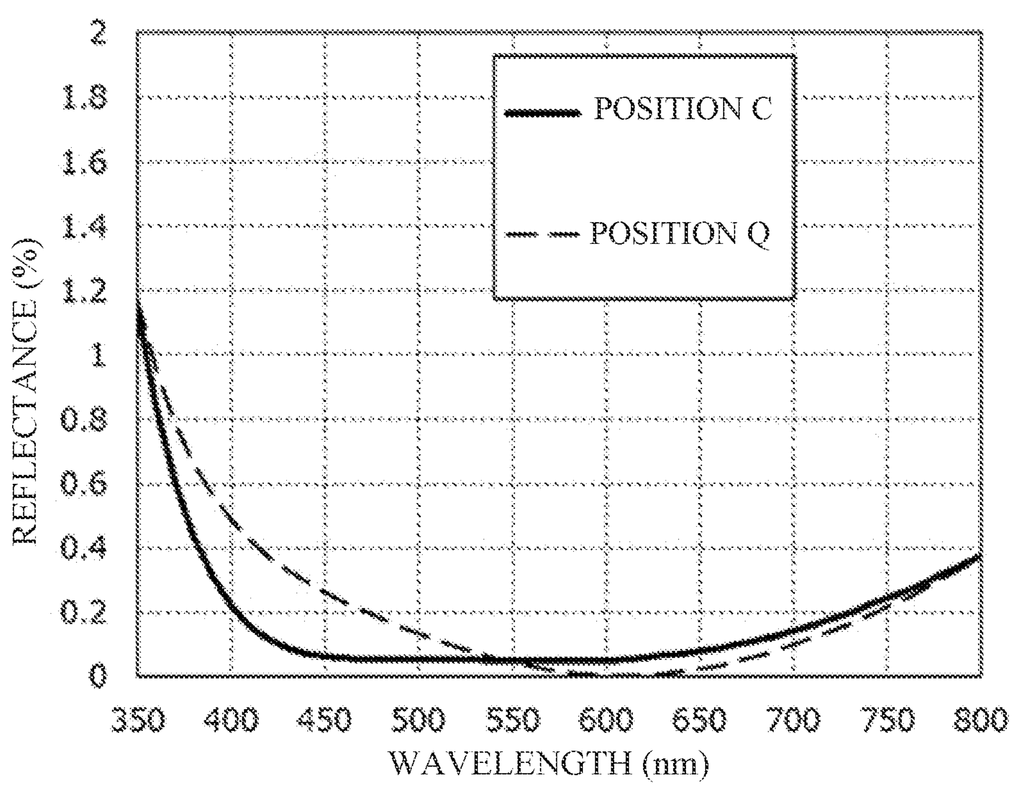
FIG. 27 shows reflectance characteristics at an incident angle of 0 degrees at positions C and Q in Comparative Example 1.

FIG. 26 shows reflectance characteristics of the antireflection film 101 at incident angles of 0, 15, 30, 45, and 60 degrees at position C. The reflectance is less than or equal to 0.2% at an incident angle of 0 degrees and within wavelengths from 420 nm to 680 nm, indicating very good reflectance properties. However, comparing the reflectance characteristics at incident angle of 0 degrees between position C and position Q in FIG. 27, it can be seen that the reflectance characteristics at position Q are worse than those at position C. According to Table 11, the film thickness at position Q of the second thin film layer 12 is 4% thicker than at position C, but the film thickness at position Q of the first thin film layer 11 is 13% less than at position C. Therefore, it can be said that the reflectance property at position Q has deteriorated.

refractive index of 1.81 (wavelength 550 nm). The lens surface of the transparent substrate 201, on which the antireflection film 101 is formed, is concave in shape. The half-open angle φ at position Q on the maximum effective diameter of the lens surface of the transparent substrate 201 is 30 degrees. As layer materials, the first thin film layer 11 consists mainly of polyimide resin, and the second thin film layer 12 consists mainly of chain silica. Table 12 shows the details of the film composition of the optical element 301 in this comparative example. The refractive index of the second thin film layer does not satisfy inequality (2).

The method of forming the antireflection film 101 in this comparative example is as follows.

(Chain Particle Coating Solution 4)

The preparation of the chain particle dispersion liquid 2 and the binder solution 2 is the same as for the hollow particle coating solution 1.

To 251.3 g of the chain particle dispersion liquid 2, 78.0 g of the binder solution 2 was added. Then, 174.5 g of 1-propoxy-2-propanol and 510.8 g of ethyl lactate were added and stirred for 60 minutes to obtain the chain particle coating solution 4.

The intermediate layer coating solution 4 and the chain particle coating solution 4 are used to form the antireflection film 101.

0.2 ml of the intermediate layer coating solution 4 was dropped onto the lens surface of the transparent substrate 201 and spin coated at 4000 rpm for 20 seconds. Next, 0.2 ml of the chain particle coating solution 4 was continuously dropped onto the lens surface of the transparent substrate 201 and spin coated at 4000 rpm for 20 seconds. Then, drying was performed in a clean room at a room temperature of 23° C. for at least 24 hours.

TABLE 11

| | | | REFRACTIVE INDEX | PHYSICAL FILM THICKNESS (nm) POSITION C | POSITION Q |
|---|---|---|---|---|---|
| ANTI-REFLECTION FILM 101 | SECOND THIN FILM LAYER 12 | IHOLLOW SILICA | 1.19 | 106.9 | 111.2 |
| | FIRST THIN FILM LAYER 11 | SiO2 | 1.45 | 85.4 | 74.0 |
| TRANSPARENT SUBSTRATE 201 | | S-TIL26 | 1.57 | — | — |

Comparative Example 2

Figure 28:
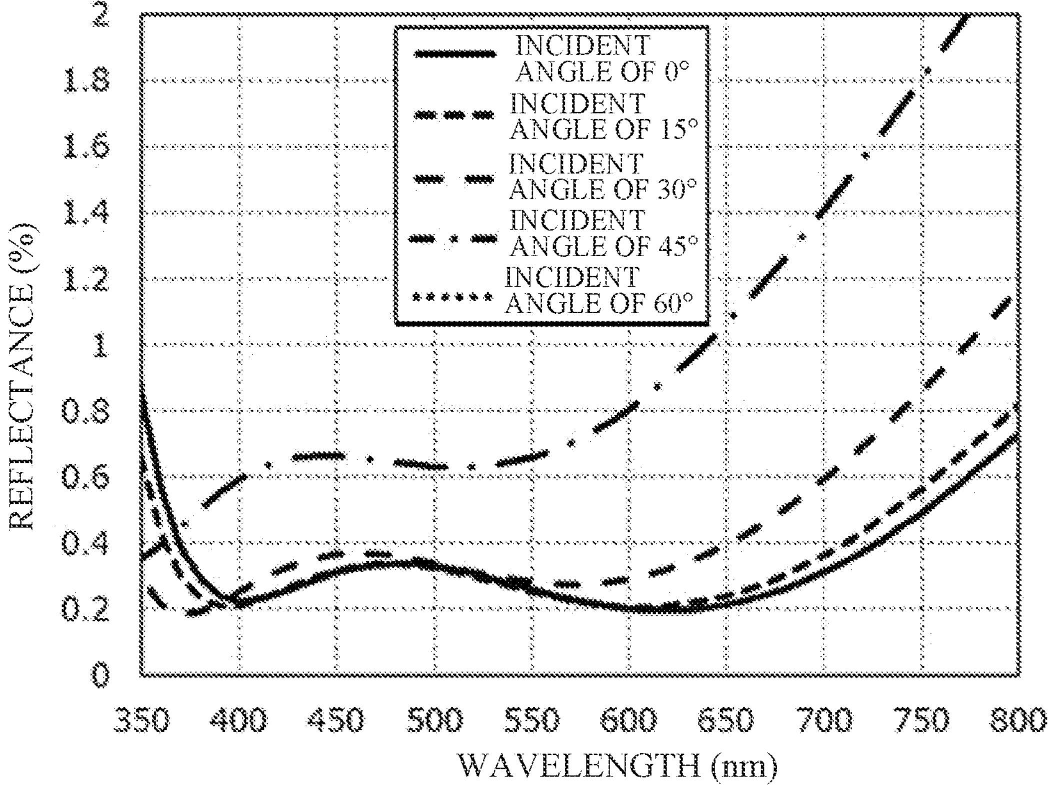
FIG. 28 shows reflectance characteristics at incident angles of 0, 15, 30, 45, and 60 degrees at position C in Comparative Example 2.

FIG. 2 is a schematic cross-sectional view of the optical element 301 according to Comparative Example 2. The optical element 301 in this comparative example is an optical element with the antireflection film 101 formed on the transparent substrate 201. The transparent substrate 201 is made of S-LAH53 (manufactured by OHARA) with a FIG. 28 shows reflectance characteristics of the antireflection film 101 at incident angles of 0, 15, 30, 45, and 60 degrees at position C. The reflectance is larger than or equal to 0.2% at an incident angle of 0 degrees and within wavelengths from 420 nm to 680 nm, which means that sufficient antireflection properties have not been achieved.

TABLE 12

| | | | REFRACTIVE INDEX | PHYSICAL FILM THICKNESS (nm) POSITION C |
|---|---|---|---|---|
| ANTI-REFLECTION FILM 101 | SECOND THIN FILM LAYER 12 | CHAIN SILICA | 1.28 | 95.1 |
| | FIRST THIN FILM LAYER 11 | POLYIMIDE RESIN | 1.62 | 73.5 |
| TRANSPARENT SUBSTRATE 201 | | S-LAH53 | 1.81 | — |

While the disclosure has been described with reference to embodiments, it is to be understood that the disclosure is not limited to the disclosed embodiments. The scope of the following claims is to be accorded the broadest interpretation so as to encompass all such modifications and equivalent structures and functions.

According to the present disclosure, it is possible to provide an optical element that enable sufficient reduction of reflectance throughout the entire lens surface.

This application claims the benefit of Japanese Patent Application No. 2022-174119, filed on Oct. 31, 2022, which is hereby incorporated by reference herein in its entirety.

What is claimed is:

1. An optical element comprising:

a substrate; and an antireflection film, wherein the antireflection film consists of a first layer formed on an optical surface of the substrate, and a second layer formed on the first layer, wherein the first layer includes a first organic compound, wherein the second layer includes a second organic compound, and wherein the following inequalities are satisfied:

$$1.30 \leq n1 \leq 1.70$$

$$1.10 \leq n2 \leq 1.26$$

$$-0.2 \leq (ns-1)-2(n1-n2) \leq 0.2$$

$$100 \leq n1d1c \leq 155$$

$$100 \leq n2d2c \leq 155$$

$$100 \leq n1d1q \leq 155$$

$$100 \leq n2d2q \leq 155$$

$$1.0 < d1q/d1c \leq 1.3$$

$$1.0 < d2q/d2c \leq 1.3$$

where ns is a refractive index of the substrate at a wavelength of 550 nm, n1 is a refractive index of the first layer at a wavelength of 550 nm, n2 is a refractive index of the second layer at a wavelength of 550 nm, d1c (nm) is a physical film thickness of the first layer on an optical axis, d2c (nm) is a physical film thickness of the second layer on the optical axis, d1q (nm) is a physical film thickness of the first layer at a most distant position from the optical axis in an effective area of the optical surface, and d2q (nm) is a physical film thickness of the second layer at a most distant position from the optical axis in the effective area of the optical surface.

2. The optical element according to claim 1, wherein the following inequality is satisfied:

$$1.12 \leq n2 \leq 1.22.$$

3. The optical element according to claim 1, wherein the second organic compound includes fluorine.

4. The optical element according to claim 1, wherein the following inequality is satisfied:

$$25 \leq \varphi < 90$$

where φ (degrees) is a maximum value of a half-open angle in the effective area.

5. The optical element according to claim 4, wherein each of the physical film thicknesses of the first layer and the second layer is the smallest on the optical axis and increases as a distance from the optical axis increases.

6. The optical element according to claim 1, wherein the second layer includes a void.

7. The optical element according to claim 1, wherein the second layer includes at least one of a solid particle, a chain particle, or a hollow particle.

8. The optical element according to claim 7, wherein at least one of the solid particle, the chain particle, or the hollow particle consists of silica.

9. The optical element according to claim 1, wherein the first layer includes a polyimide resin.

10. The optical element according to claim 1, wherein the first layer includes an epoxy resin.

11. The optical element according to claim 1, wherein the first layer includes an acrylic resin.

12. The optical element according to claim 1, wherein the first layer includes a solid particle.

13. The optical element according to claim 12, wherein the solid particle consists of silica.

14. The optical element according to claim 1, wherein in a wavelength range of 450 nm or more and 650 nm or less, a reflectance of the antireflection film with respect to light incident at an incident angle of 0 degrees at an intersection of the optical surface and the optical axis is 0.5% or less, and a reflectance of the antireflection film with respect to light incident at an incident angle of 30 degrees at the intersection is 1.0% or less.

15. The optical element according to claim 1, wherein an antifouling layer including a fluororesin is formed on a surface of the second layer.

16. The optical element according to claim 1, wherein the following inequality is satisfied:

$$1.50 \leq ns \leq 2.10.$$

17. An optical system comprising the optical element according to any one of claims 1 to 16.

18. An image pickup apparatus comprising:

the optical element according to any one of claims 1 to 16; and an image sensor configured to capture an image of an object via the optical element.

19. An optical apparatus comprising the optical element according to claim 1.

* * * * *